(12) United States Patent
Bracholdt et al.

(10) Patent No.: US 11,263,187 B2
(45) Date of Patent: Mar. 1, 2022

(54) SCHEMA ALIGNMENT AND STRUCTURAL DATA MAPPING OF DATABASE OBJECTS

(71) Applicant: SAP SE, Walldorf (DE)

(72) Inventors: Sandra Bracholdt, Dielheim (DE); Volker Saggau, Bensheim (DE); Jan Portisch, Bruchsal (DE)

(73) Assignee: SAP SE, Walldorf (DE)

( * ) Notice: Subject to any disclaimer, the term of this patent is extended or adjusted under 35 U.S.C. 154(b) by 482 days.

(21) Appl. No.: 16/399,477

(22) Filed: Apr. 30, 2019

(65) Prior Publication Data

US 2020/0349129 A1 Nov. 5, 2020

(51) Int. Cl.
| | |
|---|---|
| *G06F 16/21* | (2019.01) |
| *G06F 16/242* | (2019.01) |
| *G06N 20/00* | (2019.01) |
| *G06F 16/182* | (2019.01) |
| *G06F 16/25* | (2019.01) |
| *G06F 16/901* | (2019.01) |
| *G06F 16/2457* | (2019.01) |

(52) U.S. Cl.
CPC ........ *G06F 16/212* (2019.01); *G06F 16/1827* (2019.01); *G06F 16/213* (2019.01); *G06F 16/2423* (2019.01); *G06F 16/24578* (2019.01); *G06F 16/254* (2019.01); *G06F 16/9024* (2019.01); *G06N 20/00* (2019.01)

(58) Field of Classification Search
CPC ............... G06F 16/213; G06F 16/9024; G06F 16/1827; G06F 16/254; G06F 16/24578; G06F 16/2423; G06N 20/00
See application file for complete search history.

(56) References Cited

U.S. PATENT DOCUMENTS

| | | | |
|---|---|---|---|
| 2015/0120775 A1* | 4/2015 | Shao ................... | G06F 16/2456 707/769 |
| 2016/0357787 A1 | 12/2016 | Kolata et al. | |
| 2019/0220524 A1* | 7/2019 | Costabello ............ | G06F 16/248 |
| 2020/0160215 A1* | 5/2020 | Kotnis .................... | G06F 7/544 |

* cited by examiner

*Primary Examiner* — Marcin R Filipczyk
(74) *Attorney, Agent, or Firm* — Klarquist Sparkman, LLP

(57) ABSTRACT

A method for aligning data model schemas is provided herein. A first schema and a second schema may be received. The schemas may include sets of nodes and links between the nodes. An anchor point between the first schema and the second schema may be received. A source node in the first schema may be identified to be mapped to the second schema. A source distance may be calculated between the source node and the anchor point in the first schema. Option distances may be calculated between the anchor point and the other nodes in the second schema. Penalty scores may be calculated for the option distances. A mapping node may be selected from the nodes in the second schema based on their penalty scores. A new anchor point identifying a correspondence between the source node and the mapping node may be stored.

20 Claims, 27 Drawing Sheets

SCHEMA ALIGNMENT AND STRUCTURAL DATA MAPPING OF DATABASE OBJECTS

FIELD

The present disclosure generally relates to data mapping, schema or data model analysis, and schema alignment. Particular implementations relate to structural mapping of schemas, and systems and methods for analyzing schema structures for mapping, such as for mapping or aligning separate or disparate schemas.

BACKGROUND

Enterprise data models and database schemas are often very large and very complex, and may consist of thousands of entities, attributes, and relations among the entities and attributes. Integrating separate data models or database schemas is often difficult because of this complexity. However, not integrating systems may result in data silos, with separate systems unable to effectively or efficiently communicate. This may result in duplicative data, or old or incorrect data across different systems. Matching data models or database schemas is important for integrating systems, but matching is generally a very expensive task that is carried out by expensive domain or schema experts. Computational or semi-automated matching efforts are often natural language dependent, and so are generally not broadly applicable or effective in matching schemas for integration. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for mapping a first database model and a second database model is provided herein. The method may be implemented by one or more computing devices comprising at least one hardware processor and one or more tangible memories coupled to the at least one hardware processor.

A first representation of the first database model may be received. The first representation may include a first set of nodes and links between the nodes. At least a portion of the nodes of the first set of nodes may represent database tables and at least a portion of the links between nodes of the first set of nodes may represent foreign key relationships. A second representation of the second database model may be received. The second representation may include a second set of nodes and links between the nodes. At least a portion of the nodes of the second set of nodes may represent database tables and at least a portion of the links between nodes of the second set of nodes may represent foreign key relationships. A first anchor point defining a correspondence between a first node in the first representation and a second node in the second representation may be received. Input identifying a source node in the first representation to be mapped to one or more nodes in the second representation may be received.

A source distance may be calculated between the source node and the first node of the first anchor point in the first representation. Calculating the source distance may include identifying a fewest number of links that connect the source node and the first node of the first anchor point. One or more option distances may be calculated between the second node of the first anchor point in the second representation and one or more other nodes in the second representation. Calculating a given option distance may include identifying a fewest number of links that connect a given node in the second representation and the second node of the first anchor point.

One or more penalty scores may be calculated for the respective one or more option distances based on the respective option distances and the source distance. Calculating a given penalty score may include subtracting the source distance from the given option distance. The one or more other nodes in the second representation may be ranked based on their respective penalty scores. A mapping node may be selected from the one or more other nodes in the second representation based at least in part on their respective penalty scores. The mapping node may correspond to the source node. A correspondence between the source node of the first representation and the mapping node of the second representation may be stored.

A method for aligning a first schema and a second schema is provided herein. The method may be implemented by one or more tangible computer-readable storage media storing computer-executable instructions for causing a computing system to perform the method.

A first representation of the first schema may be received. The first representation may include a first set of nodes and links between the nodes. A second representation of the second schema may be received. The second representation may include a second set of nodes and links between the nodes. A first anchor point defining a correspondence between a first node in the first representation and a second node in the second representation may be received. Input identifying a source node in the first representation to be mapped to the second representation may be received.

A source distance may be calculated between the source node and the first node of the first anchor point in the first representation. One or more option distances may be calculated between the second node of the first anchor point in the second representation and one or more other nodes in the second representation. One or more penalty scores may be calculated for the respective one or more option distances based on the respective option distances and the source distance.

The one or more other nodes in the second representation may be ranked based on their respective penalty scores. A mapping node may be selected from the one or more other nodes in the second representation based at least in part on their respective penalty scores. The mapping node may correspond to the source node. A new anchor point identifying a correspondence between the source node of the first representation and the mapping node of the second representation may be stored.

A method for aligning graphs is provided herein. The method may be implemented in a system having one or more memories, one or more processing units coupled to the one or more memories, and one or more computer-readable storage media storing instructions that, when loaded into the one or more memories, cause the one or more processing units to perform structural data mapping operations.

A first graph representing a first data model may be received. The first representation may include a first set of nodes and links between the nodes. A second graph representing a second data model may be received. The second representation may include a second set of nodes and links between the nodes. A first anchor point defining a correspondence between a first node in the first graph and a second node in the second graph may be received. Input identifying a source node in the first graph to be mapped to the second graph may be received.

A source distance may be calculated between the source node and the first node of the first anchor point in the first graph. One or more option distances may be calculated between the second node of the first anchor point in the second graph and one or more other nodes in the second graph. One or more penalty scores may be calculated for the respective one or more option distances based on the respective option distances and the source distance.

The one or more other nodes in the second graph may be ranked based on their respective penalty scores. The ranked one or more other nodes and their respective penalty scores may be provided. A selection of a mapping node from the ranked one or more other nodes in the second graph may be received. The mapping node may correspond to the source node. A correspondence between the source node of the first graph and the mapping node of the second graph may be stored.

The foregoing and other objects, features, and advantages of the invention will become more apparent from the following detailed description, which proceeds with reference to the accompanying figures.

DETAILED DESCRIPTION

Figure 1:
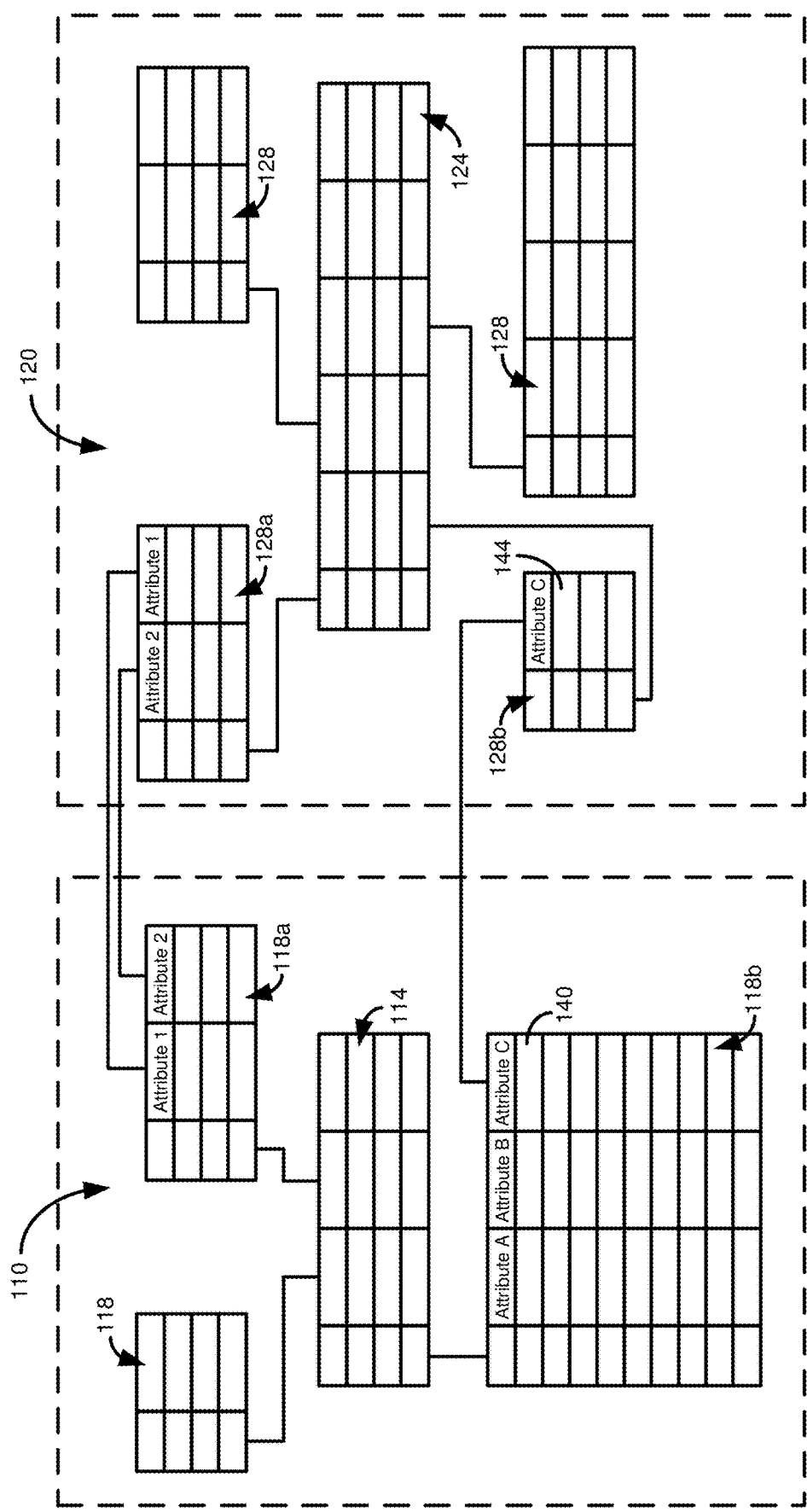
FIG. 1 is a diagram of a data model illustrating how multiple star schemas can be related.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Schema Alignment Overview

There are many scenarios where two or more database systems, such as Enterprise Resource Planning (ERP) systems, may work together to effectively or efficiently accomplish a task. For example, ETL (extract, transform, load) processes often migrate or move data from one database to another database, such as a part of system updates, database synchronizing, or data provisioning. Another example is when data from multiple databases is consolidated together into a single source, such as to improve database efficiency or make the data more broadly available (e.g. storing in the cloud). In another example, a collaboration between different people or businesses may lead to a shared database system, which may require consolidation of data from their respective database systems, or database system integration where the separate database systems from the different people or businesses communicate with each other. In all such examples, the databases must typically be aligned or mapped such that data can be accurately translated from one database to another. Generally, aligning or mapping database systems may be accomplished by analyzing the data models or database schemas of the different database systems.

As a more detailed example, an entity may acquire a standard data model rather than update or continue using their current database, including as part of transitioning to a new or updated database software. Data should be inserted into the new database from the customer's current, existing systems. This requires mapping the current database to the new database. However, the databases may be complex, and may require multiple consultants and experts to spend significant amounts of time performing the labor-intensive task of mapping the current data model to the new data model. For example, database schema for ERP systems often include thousands of tables, where each table can include many different fields. The tables and fields can be interrelated, and the schema can be even more complex to analyze given that the tables and fields often do not have names that are easily understood by humans. Automating or semi-automating the data mapping or schema aligning process makes mapping the data models much easier, less costly, less labor-intensive, faster, and may also improve the quality of the final mapping.

In another detailed example, a customer may have several different data models in use in a database system. The customer may want to generate a consolidated view of data from several of the different data models in the database. Therefore, the different data models need to be aligned or mapped so that the data consolidated in the new view may be a meaningful or accurate set of data from the different data models. While not all data may be needed from the different data models, the customer generally must analyze the entire data models to make the correct determinations as to which data is needed from each data model. Similarly as before, automated or semi-automated data mapping or schema alignment processing may make achieving the consolidated view easier, less costly, less labor-intensive, faster, and may also improve the quality of the final view based on the data model mappings.

The disclosed technologies herein provide schema alignment through structural data mapping, which may achieve the data mapping goals described in the provided examples. For example, ETL processes may be effected from one database to another through data mapping achieved through the described structural data mapping and schema alignment. Database views, new database systems, or APIs may be developed for use between different database systems based on data mappings achieved through the structural data mapping analysis provided herein. Schema alignment or structural data mapping may provide a determined mapping between elements of different data models, or may provide a set of meaningful candidates or options for data mapping. Such candidates may be provided to a user to assist in their data mapping, or may be processed by a heuristic or trained machine-learning algorithm to make a mapping determination.

A data model may be an abstract model which may organize elements of data and standardize how they relate to one another and to properties of real world entities. A data model may be a conceptual data model, broadly defining elements, or a physical data model, specifically defining an implementation structure (e.g., definitions of specific database objects, such as database tables or views, in a specific programming language or database implementation, including definitions of relationships between such specific objects). A data model may be a schema, such as a database schema. A data model or schema may be represented as a graph, as described herein. In some embodiments, data models or data model representations used in the data model mapping technologies described herein may be represented as matching metastructure schemas or models, disclosed in MATCHING METASTRUCTURE FOR DATA MODELING patent application filed concurrently herewith, having inventors Sandra Bracholdt, Joachim Gross, Volker Saggau, and Jan Portisch, and incorporated herein by reference. Additionally or alternatively, data models or data model representations used in the data model mapping technologies described herein may be clustered data model representations, disclosed in CLUSTERING WITHIN DATABASE DATA MODELS patent application filed concurrently herewith, having inventors Sandra Bracholdt, Bjoern Pantel, Volker Saggau, and Jan Portisch, and incorporated herein by reference.

Data model mapping may include the process of creating data element mappings between two distinct data models. This process may include data transformation or data mediation between a data source (e.g. source data model or representation) and a destination (e.g. a target data model or representation). Data model mapping may include identification of data relationships, which may be accomplished as part of a data lineage analysis, or identification of hidden, sensitive, or private (e.g. personally identifying information) data. Data mapping may also include consolidation of multiple data models into a single data model, which may include eliminating or reducing duplicative or redundant data (e.g. columns, tables, etc.).

Data mapping may be structural data mapping. Structural data mapping creates mappings based on the structural relationship of elements in the data models. Structural mapping identifies similar or semantically equivalent elements (e.g. tables in a database schema) based on their structural relationship to other elements around them, in each data model. Generally, by analyzing the structure of elements in data models, the structural data mapping process is language/format agnostic. Being language agnostic means that the structural data mapping process does not depend on language constructs in the data models, such as database table names, field or attribute names, or so on. Thus, structural data mapping can map data models using different natural languages (e.g. can map a database schema in English to a database schema in Chinese) or that do not use human-meaningful names (e.g. database tables with computer-generated names such as "tableA456_63"). Accordingly, the disclosed technologies can be used to map between two schema, where the schema may be the same, except for having different identifiers/descriptions, or where elements of the schema, such as objects or object elements having different names or identifiers, different data types, or object elements (e.g., fields) that appear in a different order within a given object. Structural data mapping, as described herein, may provide a data mapping between elements in the mapped data models, or it may provide a set of meaningful candidates or options for mapping, which may then be selected from by a user or another process, such as a machine-learning algorithm trained to select from such structurally-identified candidate sets.

Generally, data mapping endeavors to identify semantically equivalent elements or objects. Semantically equivalent data objects are objects that have the same or approximately the same conceptual data, even if named, stored, or organized differently within the object. For example, a table named "Users" with fields "name," "ID," and "permissions" may be semantically equivalent to a table named "t453_1" with fields "a", "b," "c," and "d."

Schema alignment and data mapping functionality may be provided in database analytics software, database management software, ERP software, or other database-driven software systems. Examples of such tools are: SAP FSDP™, SAP FSDM™, SAP Data Warehouse as a Service (DWaaS)™, SAP PowerDesigner™, SAP Enterprise Architect™ SAP DataHub™, SAP HANA™, S/4HANA™, C/4 HANA™, HANA Native Data Warehouse™, all by SAP SE of Walldorf, Germany.

The present disclosure begins with a description of database schema, how objects in a schema can be related, and how multiple paths can exist between a pair of schema objects (which can, for example, affect how efficiently processes that use the schema can be carried out), in Examples 2-5. Examples 6-14 describe disclosed technologies that facilitate mapping between such schemas.

Example 2—Example Relationships Between Star Schemas

FIG. 1 schematically depicts two star schemas 110, 120. Star schema 110 includes a central fact table 114 and three dimension tables 118. Star schema 120 includes a central fact table 124 and four dimension tables 128. The star schemas 110, 120 may be examples of schemas as described herein for schema alignment. In some embodiments, the two star schemas 110, 120 may be treated as a single schema for mapping to another schema.

In order to obtain data from multiple star schemas, a dimension table that is common to both fact tables is used to bridge the two schemas. In some cases, such bridging can occur if one dimension table is a subset of the other dimension table (e.g., one table contains all the attributes of the other, plus one or more additional attributes). In further cases, bridging can occur as long as at least one attribute is shared, or conformed, between the two star schemas.

For example, in FIG. 1, dimension table 118a is identical to dimension table 128a (other than, potentially, a record ID or other means of identifying tuples that does not convey substantive information). Or, rather than having duplicate tables, dimension table 118a and dimension table 128a can be the same table, but represented as members of multiple star schemas. Each attribute in the dimension tables 118a, 128a can serve as a pathway between facts in fact table 114 and facts in fact table 124. However, each of these pathways is different, in that different attributes are linked together. It can be important which attributes are used to link dimension tables 118a and 128a. For example, operations (e.g., specified by a SQL statement) to implement the pathways may be different. Additionally, some of the pathways may use indexed attributes, while others may not, which can affect the execution speed of a particular pathway.

In the example scenario of FIG. 1, an alternate way of obtaining facts from fact tables 114 and 124 is through the use of attribute 140 of dimension table 118b and attribute 144 of dimension table 128b. However, as shown in FIG. 1, table 118b includes a larger number of tuples than table 118a, which can result in a path involving table 118b having a longer execution time, and requiring more computing resources, than a path involving table 118a.

Example 3—Example Table Relationships Using Primary and Alternate Keys

Figure 2:
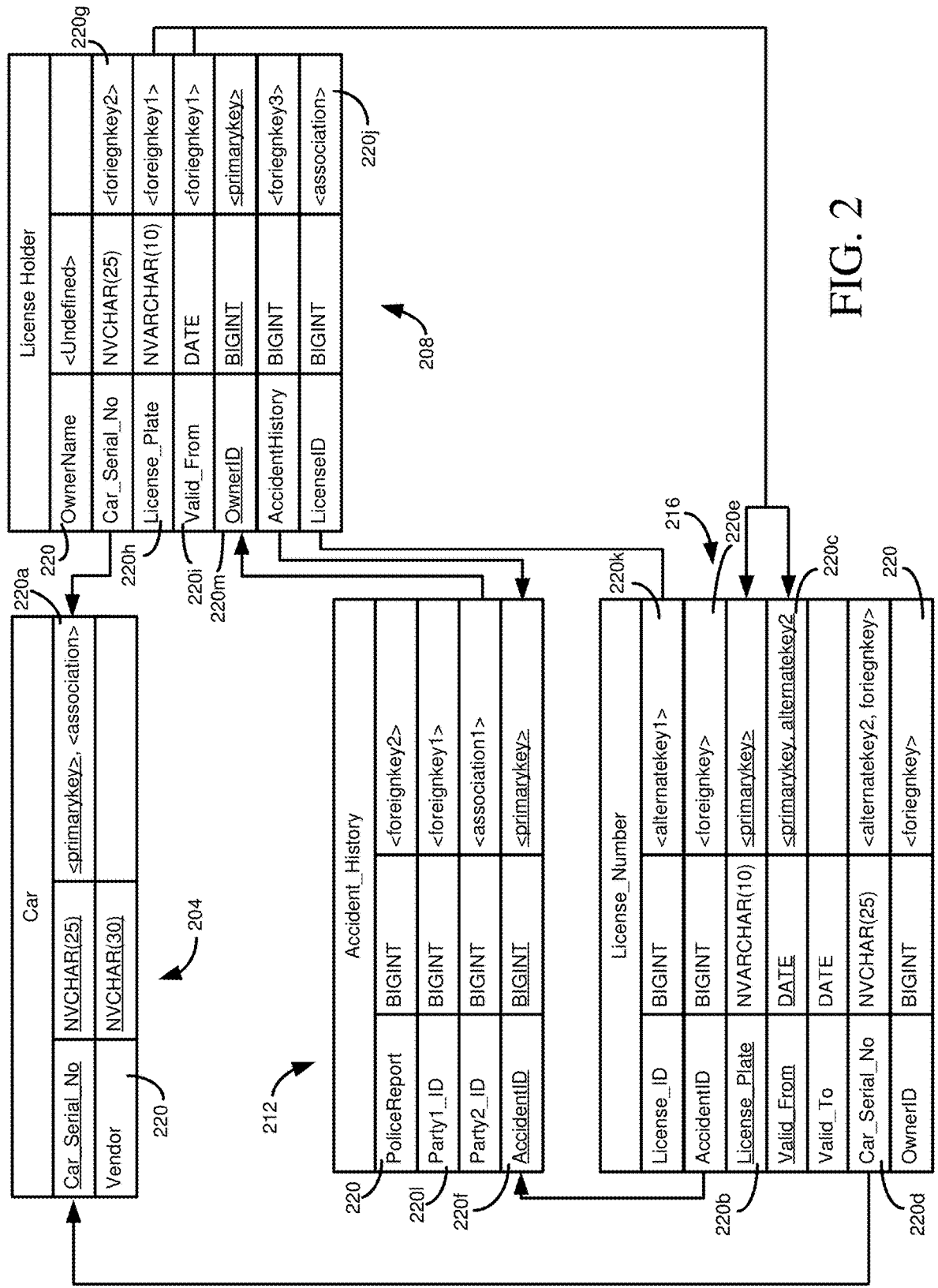
FIG. 2 is a diagram of a data model illustrating how tables can be related by foreign keys or associations, and how multiple pathways between tables can exist.

FIG. 2 schematically depicts how tables can be connected via multiple pathways, and how pathways can be through different table attributes. FIG. 2 illustrates a table 204 representing a car, a table 208 representing a license holder (e.g., a driver having a driver's license), a table 212 providing an accident history, and a table 216 representing a license number (e.g., associated with a license plate). The tables 204, 208, 212, 216 may be examples of elements or structural components for a schema or data model, as described herein for schema alignment.

Each of the tables 204, 208, 212, 216 has a plurality of attributes 220 (although, a table may only have one attribute in some circumstances). For a particular table 204, 208, 212, 216, one or more of the attributes 220 can serve as a primary key—uniquely identifying particular records in the tuple and being designated as the main method of accessing tuples in the table. For example, in the table 204, the Car_Serial_No attribute 220a serves as the primary key. In the table 216, the combination of attributes 220b and 220c together serve as the primary key.

A table can reference records associated with the primary key of another table through the use of a foreign key. For example, the license number table 216 has an attribute 220d for a Car_Serial_No in table 216 that is a foreign key and is associated with the corresponding attribute 220a of table 204. The use of a foreign key can serve various purposes. The foreign key can link particular tuples in different tables. For example, a foreign key value of 8888 for the attribute 220d would be associated with a particular tuple in table 204 having that value for attribute 220a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 216, for instance, has an alternate key that is formed from attribute 220c and attribute 220d. Thus, a unique tuple can be accessed in the table 216 using either the primary key (e.g., being a foreign key in another table) or through an association to the alternate key.

In the scenario of FIG. 2, it can be seen that multiple pathways exist between tables. For example, consider an operation that is to collect data from table 216 and table 208. One pathway is to move from table 216 to table 212 using the foreign key 220e. Then, table 208 can be reached through the foreign key relationship of attribute 220l of table 212 to the primary key 220m of table 208. Alternatively, table 208 can be reached from table 216 through table 204, since table 216 has an attribute 220d that serves as a foreign key for the primary key 220a of table 204, and attribute 220a is also an associate to the alternate key of attribute 220g of table 208.

In the above scenario, both paths have the same length, but link to different attributes of table 212. The scenario of FIG. 2 is relatively simple, so it can be seen that as the number of tables in a data model increases, the number of possible paths can increase greatly, making determining any path, much less the most efficient path for a particular scenario, complex. In addition, even between two tables, multiple, different pathways can exist. For example, table 208 can access tuples of table 216 through the foreign key attributes 220h, 220i of table 208, accessing primary key attributes 220b, 220c of table 216, or using the association provided by attribute 220j of table 216 which references attribute 220k, an alternate key of table 216. Although the ultimate path is different, table 208 to table 216 are still connected via multiple paths, which are different in that different attributes 220 are connected.

If the tables 204, 208, 212, 216 were represented in a graph, each table may be a node. Paths between tables 204, 208, 212, 216 can be edges, which can be unidirectional or bidirectional. However, different paths between tables form different edges. Again using the path between tables 208 and table 216 as an example, the path through the foreign key attributes 220h, 220i is a different edge than the path through the association attribute 220j.

Example 4—Example Graph Representation of Database Objects and Graph Traversal

Figure 3A:
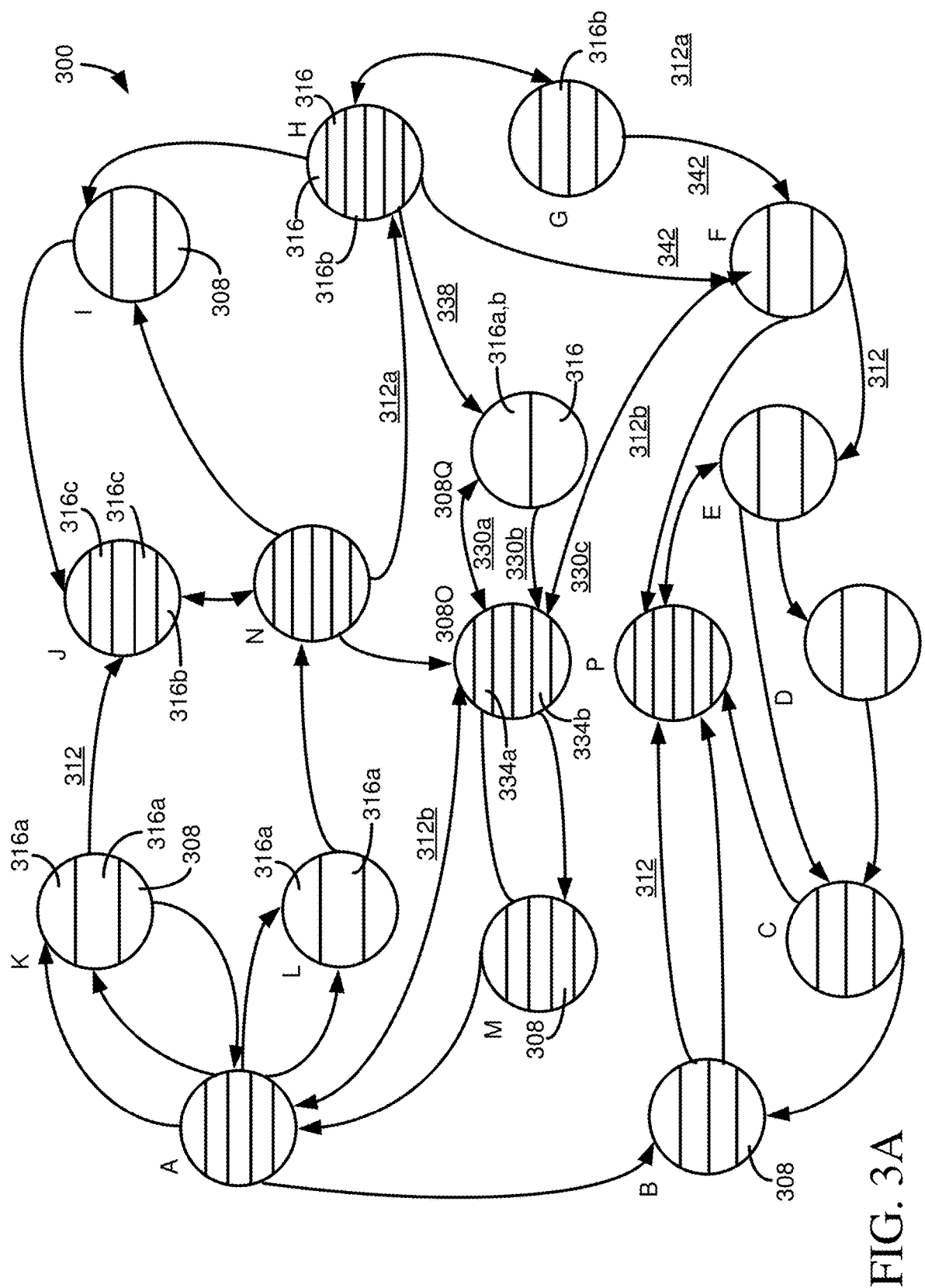
FIG. 3A is a schematic representation of a network of nodes, representing database objects, such as tables, and how multiple pathways can exist between nodes, including through edges connecting to different node attributes.

FIG. 3A illustrates a graph 300 that includes a plurality of nodes 308, where each node 308 is connected to one or more other nodes through one or more edges 312. Edges 312 may be bidirectional or unidirectional. The nodes 308 can represent data sources, such as tables in a relational database. The edges 312 can represent relationships between tables. For example, an edge 312 can represent a primary-foreign key relationship, an association-alternate key relationship, or some other relationship. The graph representation 300 may represent a data model or schema, as described herein, and may be used for schema alignment and data mapping.

Each of the nodes 308 is segmented into multiple sections 316. Each section 316 can represent a different attribute (or column or field) of a table. Some of the sections 316, such as sections 316a, can be unidirectionally connected to one or more attributes of one or more other nodes 308. Other sections, such as sections 316b, can be bidirectionally connected to one or more attributes of one or more other nodes 308 (e.g., an attribute can be both a foreign key or association and a primary key or alternate key). Additional sections 316, such as sections 316c, are not (at least currently) connections to other nodes 308.

In at least some aspects, unidirectional edges, such as edges 312a, can allow a node 308 connected to the tail of an edge to retrieve information from the node connected to the head of the edge. For unidirectional edges 312a, the node 308 connected to the head is typically not able to retrieve information from the node at the tail, at least not through that edge.

For example, a node 308 connected to the head may have a primary key that is an attribute 316 that services as a foreign key for a node connected to the tail of the edge 312a. The primary key serves to uniquely identify data (e.g., rows, records, or tuples of a relational database table) of the node 308 proximate the head. However, in at least some cases, the primary key of the source node 308 does not uniquely identify data of the target node, the node proximate the tail.

In some cases, the primary key of the source node 308 (which can be a target node that is a starting point for a path) can uniquely identify data of a destination node (which can be a target node that is a destination or ending point for a path), such as when the primary key of the source node is also the primary key or an alternate key of the destination. Additionally, in some aspects, although the foreign key used by a node 308 may not be a primary key, it may be part of a super key (including a candidate key, which can be the primary key), or alternate key, of the node.

The primary key (or other type of key) of a node 308 may include attributes that reference attributes of multiple other nodes. For example, the primary key of a node 308 may include a first attribute from a first referenced node, such as using a foreign key or an association to an alternate key of such node, and a second attribute from a second referenced node, such as a foreign key or an association to an alternate key of such second referenced node.

FIG. 3A illustrates seventeen nodes 308. For large database systems, such as are common for ERP applications, the number of nodes may be orders of magnitude larger. However, even for the comparatively small number of nodes 308 in FIG. 3A, it can be seen that multiple pathways exist between any given node 308. As has been described, even for someone with knowledge of the nodes 308 and their relationships, it can be difficult to determine a route, all routes, or a best route between two nodes, at least if the nodes are not directly connected.

One or more pathways can be identified for obtaining data from at least a first node 308 and at least a second node. Pathways can be identified by representing nodes in a data structure, such as a graph data structure that includes the nodes 308 and connecting edges 312. In some cases, the edges 312 can have one or more weights (e.g., a weight value, a vector of weight values, or a composite or abstract data type that includes one or more values). Weights can represent costs, such as network, memory, or CPU costs that would be incurred, a number of tuples processed, query complexity, or other measures of edge (and therefore path) desirability. In other cases, pathways can be determined without the use of weights.

In particular aspects, a graph traversal method is used to determine one or more paths between two or more specified nodes 308. In some cases, the traversal can determine all paths, while in other cases the traversal method can determine a subset of paths, such as a shortest path (where shortest can refer to a smallest number of nodes traversed or smallest with respect to one or more weights, or a cost function that includes multiple weights). In a particular example, a depth-first search is used to determine paths between two given nodes. In a more particular example, the depth-first search considers a single edge between pairs of nodes in a prospective path, even if multiple edges exist when considered at attribute-level granularity. Once paths are determined, attribute-level edge information can be added to the path information so that such edge information is not lost.

To illustrate how different edges 312 can be used to distinguish paths, in FIG. 3A, a node 308O is connected to a node 308Q by edge 330a. Edge 330a connects to attribute 334a of node 308O. Attribute 334b is connected to nodes 308Q and (308) F by edges 330b and 330c, respectively. If node 308O is a terminating or target node in the path (e.g., the starting or ending node), a path through edge 330a would not be considered equivalent to a path through edge 330b, because the edges connect to different attributes of node 308O. Among other things, a request to retrieve or modify data, such as a SQL statement, would typically be constructed differently depending on whether attribute 334a or attribute 334b was being accessed (e.g., SELECT . . . WHERE ATTRIBUTE334A=VALUE versus SELECT . . . WHERE ATTRIBUTE334B=VALUE).

Similarly, if node 308O was not a terminating node, paths through edges 330a or 330b, 330c would not be considered equivalent, at least in a final path determination, or when operations are generated to define a particular path (e.g., one or more SQL statements). First, other portions of the paths would typically be different. For example, traversing edge 330a would require a path that includes edge 338. Traversing edge 330c would require a path that includes one of edges 342. So, a path through edge 338 may have a different length (e.g., number of nodes) or cost than a path through an edge 342. Second, operations to access data, such as SQL statements, via the paths would be different.

Graph traversal algorithms typically assume that edges 312 between nodes 308 are equivalent. That is, if an edge accesses a first node, that access is equivalent to the access of an edge from any other second node that accesses the first node. Similarly, typical traversal methods assume that two nodes are connected by one edge (which could be unidirectional or bidirectional). In the event these conditions hold true, such typical graph traversal methods can be used, as well as other methods, such as Dijkstra's algorithm or the use of spanning trees (including minimum spanning trees) can be used for path calculations. However, in at least some cases, a traversal method is used that finds more than just the shortest available path, such as all paths, or a subset of all paths that includes more than a single path, including a subset of paths that are noncyclical or which satisfy other constraints (e.g., cost constraints, constraints on which nodes may or may not be in a path). Once paths are determined, attribute-level edge information can be added to the paths.

Pseudocode for a suitable traversal method is:
Start at the first target node (e.g., a starting node for the path);
Get a list of all nodes immediately reachable from the first target node;
Call the depth-first search method recursively for each node of the list;
If the node is the second target node, mark all nodes in the found path as searched (such as using a flag or Boolean value);
If the node has the calculated flag set, save the current path, and return to the previous node in the path;
Otherwise, traverse all nodes connected to the current node;
Remove all nodes that are not part of a saved path; and
Add all possible edges between the nodes.

In some cases, such as using the above pseudocode, a path finding method can determine a set of nodes that are reachable without considering how they are reachable. That is, a first connection to a node through a first edge to a first attribute is considered to be equivalent to a second connection to the node through a second edge to a second attribute. Once the set of reachable nodes has been determined, the edges between the nodes can be added. A visual depiction of the graph can be provided to a user, and the user may visualize how a given path may involve connections to different attributes of a particular table.

Figure 3B:
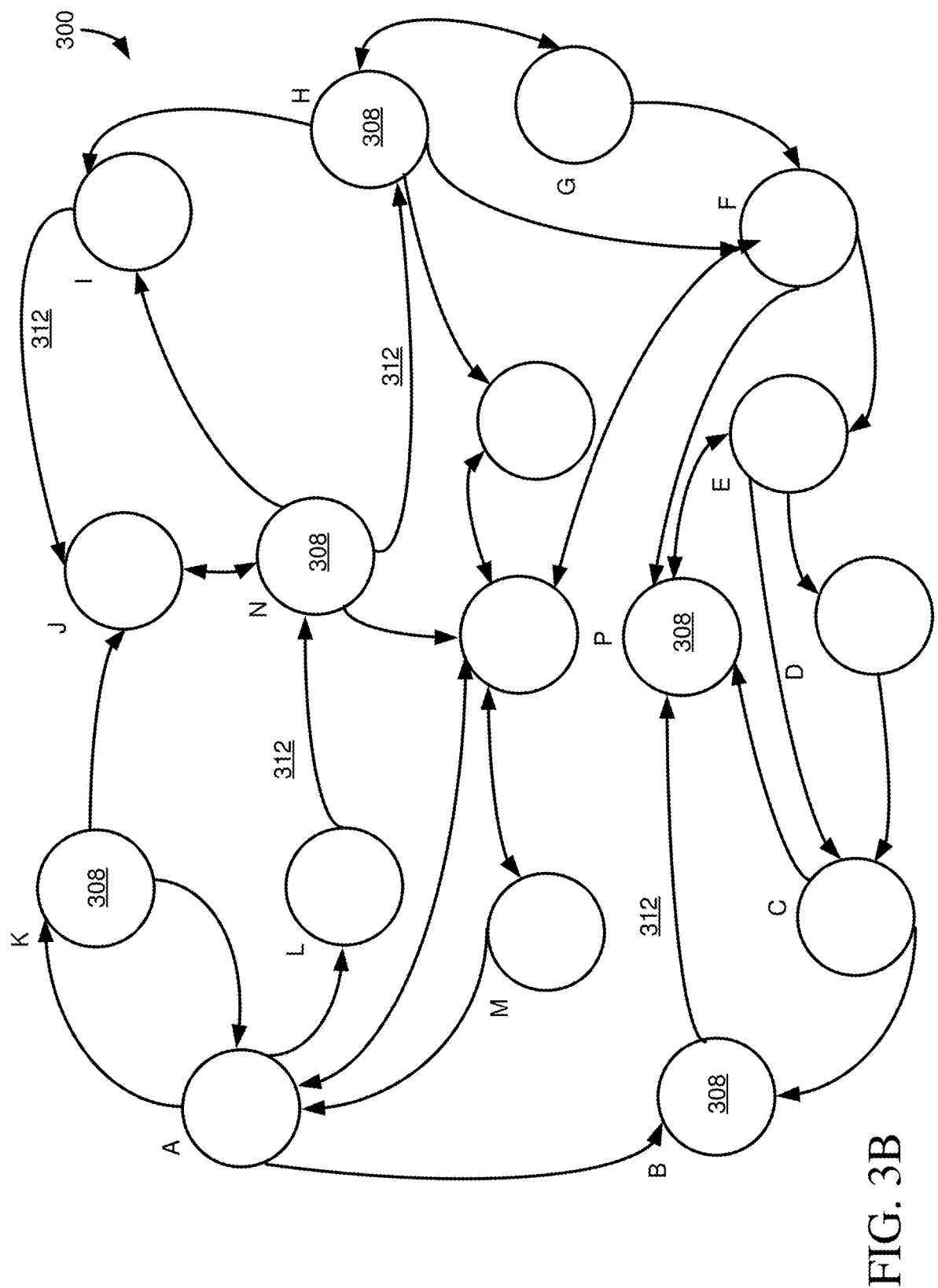
FIG. 3B illustrates the network of nodes of FIG. 3A, where a single edge connects related nodes and differences in connected attributes are not taken into account.

FIG. 3B illustrates the graph of 300 showing edges 312 between nodes 308, where it is not considered to which attribute(s) an edge connects, and multiple edges between nodes are reduced to a single edge. The above pseudocode can be used to determine paths between nodes. When the paths are to be displayed to a user, the individual edges between attributes can be added in to provide information as shown in FIG. 3A. The user can then determine which of the available paths are more suitable for their purposes, including considering which paths involve the fewest number of nodes, which paths may be more efficient, and paths that may include nodes that have information that may be of interest for a particular purpose (e.g., will be retrieved in a query that traverses the path).

In other aspects, a path determination method can distinguish between different edges to a particular node. For example, assume a node A has a first edge to a first attribute of a node B and a second edge to second attribute of node B. A path from node A to node B through the first edge can be considered different than a path from node A to node B through the second edge.

In some cases, a user can supply path constraints. For example, a user can specify nodes that must be on a path or that must not be on a path. Required nodes can be in the form of a white list prior to an initial path determination, or can be provided by a user (and added to a white list) after an initial path termination. Similarly, prohibited nodes can be provided in the form of a black list prior to initial path determination, or can be provided to a user (and added to a black list) after initial path determination. After an initial path has been determined, nodes can be indicated as required or prohibited in response to user input provided using a display of a current graph of nodes and their interconnections.

When a user selects one or more nodes to be required or prohibited, the paths between nodes can be recalculated and an updated graph, typically with fewer paths, and potentially fewer nodes, can be displayed to a user. The user can interactively designate nodes to be required or prohibited to reduce the number of paths displayed. The user can select a final path, which can result in the generation of operations, such as SQL statements, to implement the chosen path.

In typical traversal methods, nodes are not visited multiple times. However, in some aspects, a traversal method can visit a node multiple times. Visiting a node multiple times can be allowed, in some cases, when multiple edges exist to the node. Visiting a node multiple times can be allowed, in further cases, when a node is required to be on a path.

Consider a set of nodes A, B, C, M, and Z. Assume node A is connected to node B, node B is connected to node C, node C is connected to nodes M and Z, and node M is connected to node Z. If multiple visits to a node are not allowed, and node M is a required node, no path exists from node A to node Z, because the only way to node Z is through node C, and node C must be reached to visit node M. However, if multiple visits to a node are allowed, and node M is a required node, a path does exist from node A to node Z, although it involves node C being visited twice—from node B to node C and from node M to node C. In further aspects, a node can be visited multiple times so long as the visits occur through different attributes. For instance, in the above example, multiple visits to node C may be allowed if the edge from B to C connects to a first attribute of node C and the edge from M to C connects to a second attribute of node C.

As mentioned, in some cases, intermediate nodes can be specified as being required for a valid path or being excluded from a valid path. In one example, when a node is specified as being required, candidate paths are evaluated. When a candidate path is determined to connect a first target and a second target node (i.e., the endpoints of the path), it is determined whether the path includes all intermediate nodes that are required for a valid path (e.g., all nodes on a white list). If it does, the path is selected as a possible path and saved. If not, the path is discarded. However, sufficient path information can be saved (e.g., a flag is set) such that the same path is not reevaluated for a particular path determination instance.

In another example, when a particular node is specified as being prohibited for a valid path, calculation of a particular path stops as soon as a node is encountered that is on the list of prohibited nodes, or black list. That is, the path finding method does not iterate over nodes on the black list. In this way, no paths indicated as valid will include a prohibited node. In other aspects, black listed nodes are just removed from the set of available nodes.

Example 5—Example User Interface Screens

FIGS. 4-7 present example user interface screens according to an example embodiment of the disclosed technologies. The example user interface screens can allow a user to visualize paths between nodes, obtain path information (for example, nodes visited, node attributes accessed, and example operations for the path, such as SQL statements to implement the path).

Figure 4:
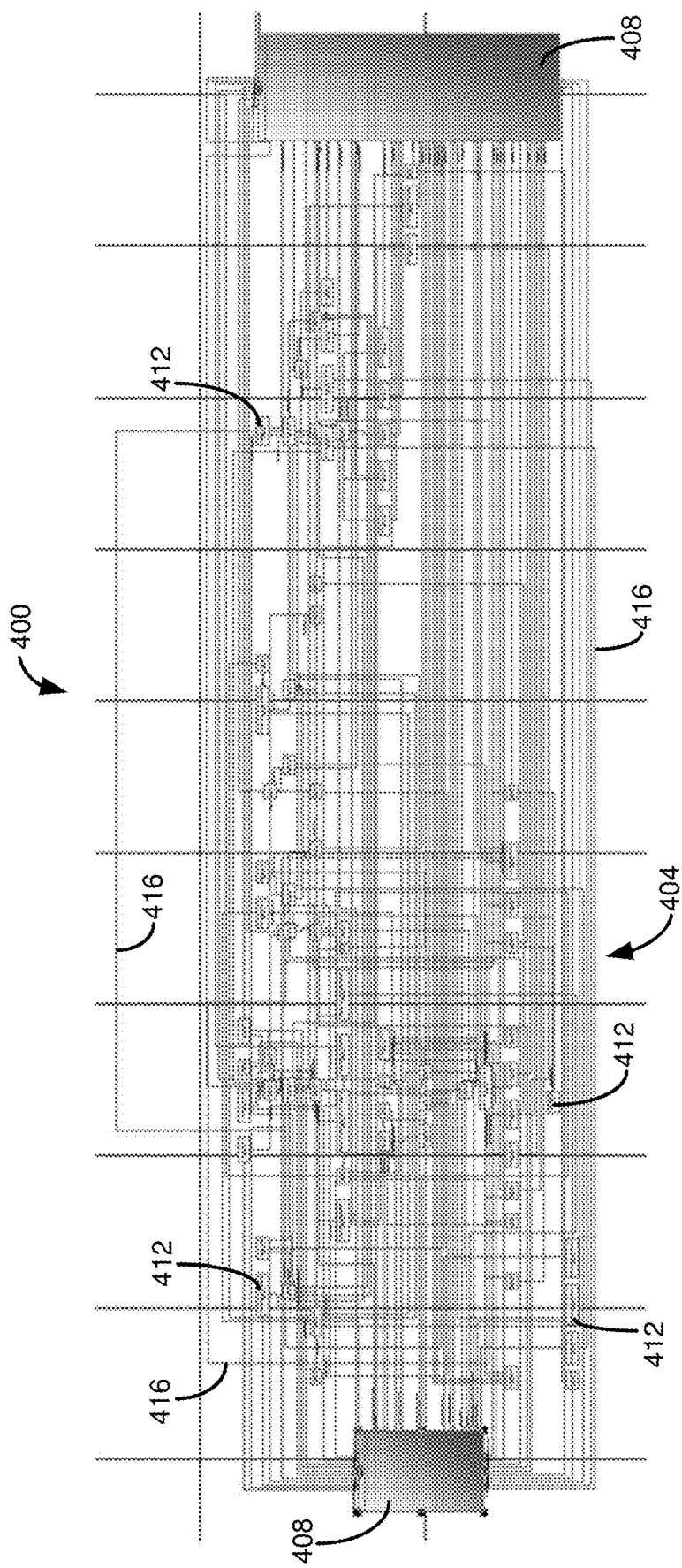
FIG. 4 is an example user interface screen illustrating multiple paths between two target nodes.

FIG. 4 illustrates a user interface screen 400 that illustrates a graph 404 of target tables 408 (e.g., tables having one or more attributes from which data is to be retrieved) and connecting tables 412. Connections 416 link pairs of target tables 408, connecting tables 412, or combinations thereof. The graph 404 can include 80 tables from which connections 416 and pathways can be formed.

Each connection 416 typically indicates a unique edge in a path between the target tables 408 (e.g., between particular sets of one or more attributes of the tables connected by the edge). In some aspects, if a user selects a connection 416, the corresponding path or paths associated with the connection is highlighted. For example, the selected path might be enlarged, displayed in a different color, displayed in a different line width or pattern, highlighted, or otherwise visually distinguished from connections 416 of other paths. Selecting a path may also present operations, such as SQL statements, implementing the path. In some cases, a user may copy and paste the operations, or designate that the operations be used in a particular application.

A user may also select tables 412 or connections 416 to be placed on a list of required tables or connections or a list of prohibited tables or connections. For example, a user may perform a pointing action, such as right-clicking, on a node or connection to display a list of options, which can include adding the node or connection to a list of required nodes or connections or a list of prohibited nodes or connections. Or, user interface elements can be displayed to allow a user to tag tables 412 or connections 416 as being required or prohibited. In some cases, each time a table 412 or connection 416 is indicated as required or prohibited, paths in the graph 404 can be recalculated and displayed. In other cases, a user may make various annotations to the graph 404, and can manually indicate (e.g., by selecting a "recalculate" icon) that recalculation should be performed. In still further embodiments, a user can add required or prohibited nodes to a table, and the information in the table can be used to recalculate paths in the graph 400, including when indicated by a user.

Figure 5:
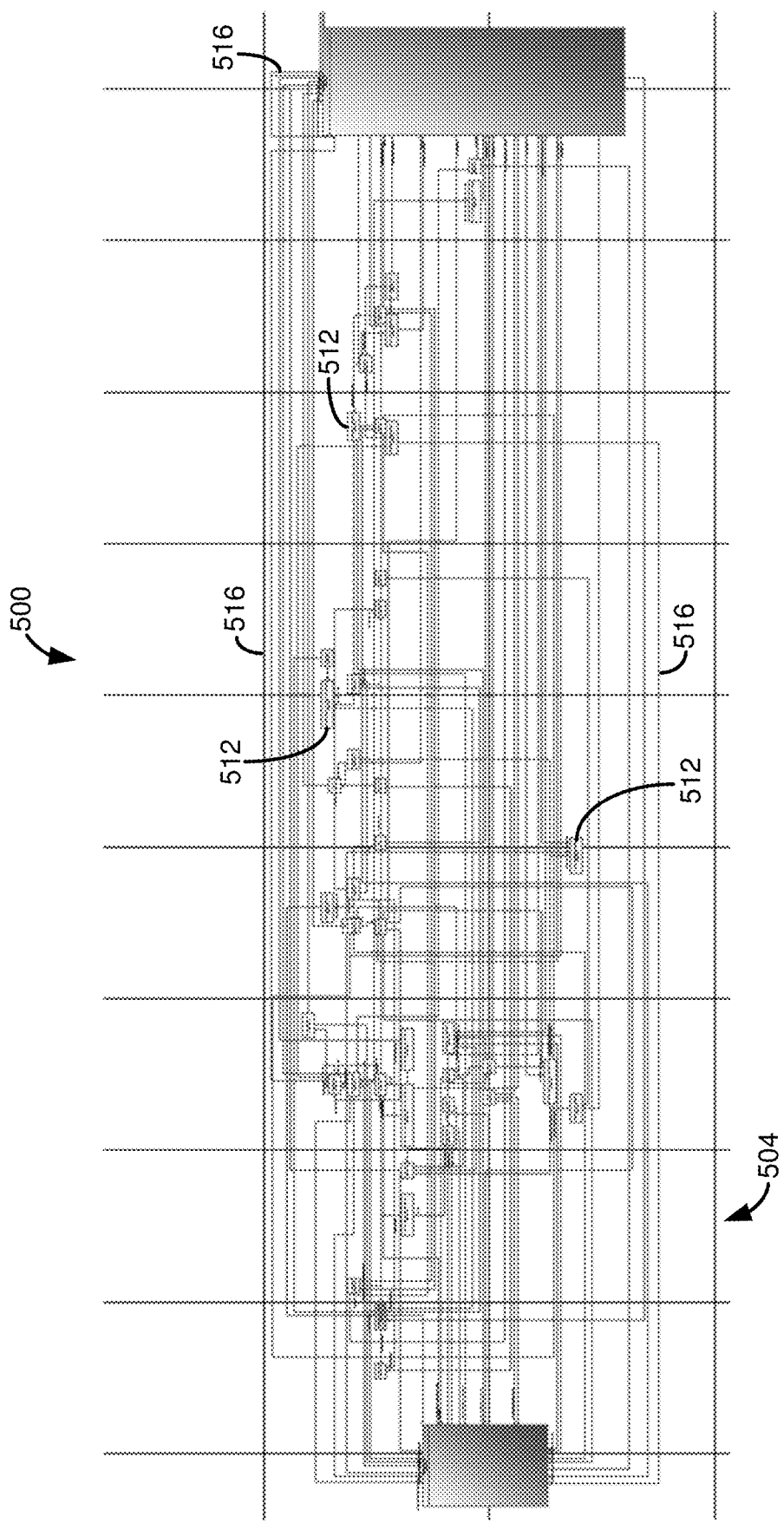
FIG. 5 is an example user interface screen illustrating how paths can be reduced between the target nodes of FIG. 4 by specifying a particular node as required for a path to be valid.

FIG. 5 illustrates a user interface screen 500 having a graph 504 that can be similar to the user interface screen 400 of FIG. 4. However, in FIG. 5, a single table has been added to a list of required tables. It can be seen that the number of connections 516, and consequently pathways, has been greatly reduced compared with FIG. 4. For example, while the graph 404 can have 80 tables, the graph 504 can have 44 tables 512—a reduction of almost half merely by marking a single table as required.

Figure 6:
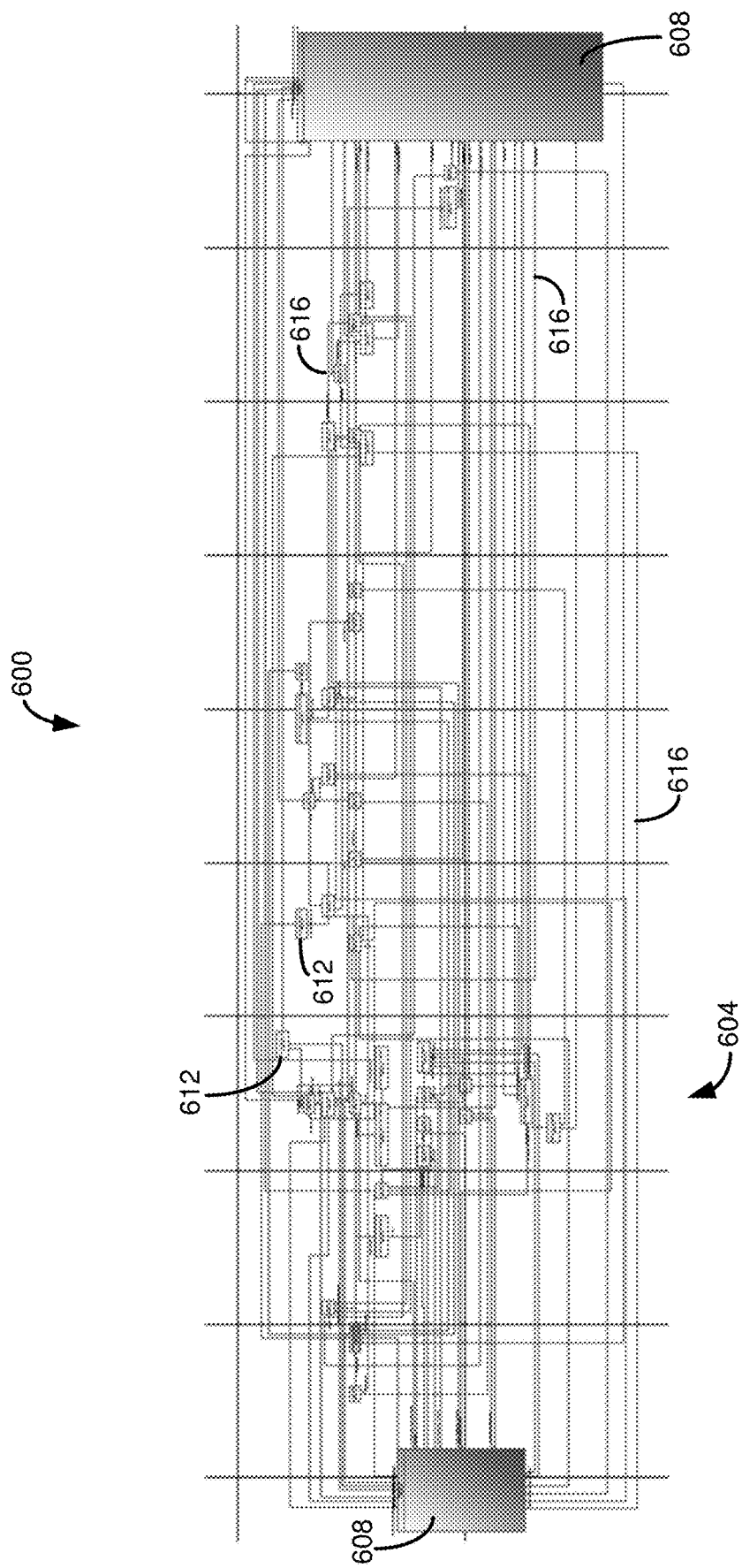
FIG. 6 is an example user interface screen illustrating how paths can be reduced between the target nodes of FIG. 4 by specifying a particular node as prohibited for a path to be valid.

Similarly, FIG. 6 illustrates a user interface screen 600, which can be similar to the user interface screen 400 of FIG. 4, having a graph 604. In the screen 600, a single table was added to a list of prohibited tables. Again, the number of connections 616 and intermediate tables 612, and consequently pathways, between target tables 608 has been greatly reduced compared with FIG. 4. For example, while the graph 404 can have 80 tables, the graph 604 can have 42 tables—a reduction of almost half merely by marking a single table as prohibited.

Figure 7:
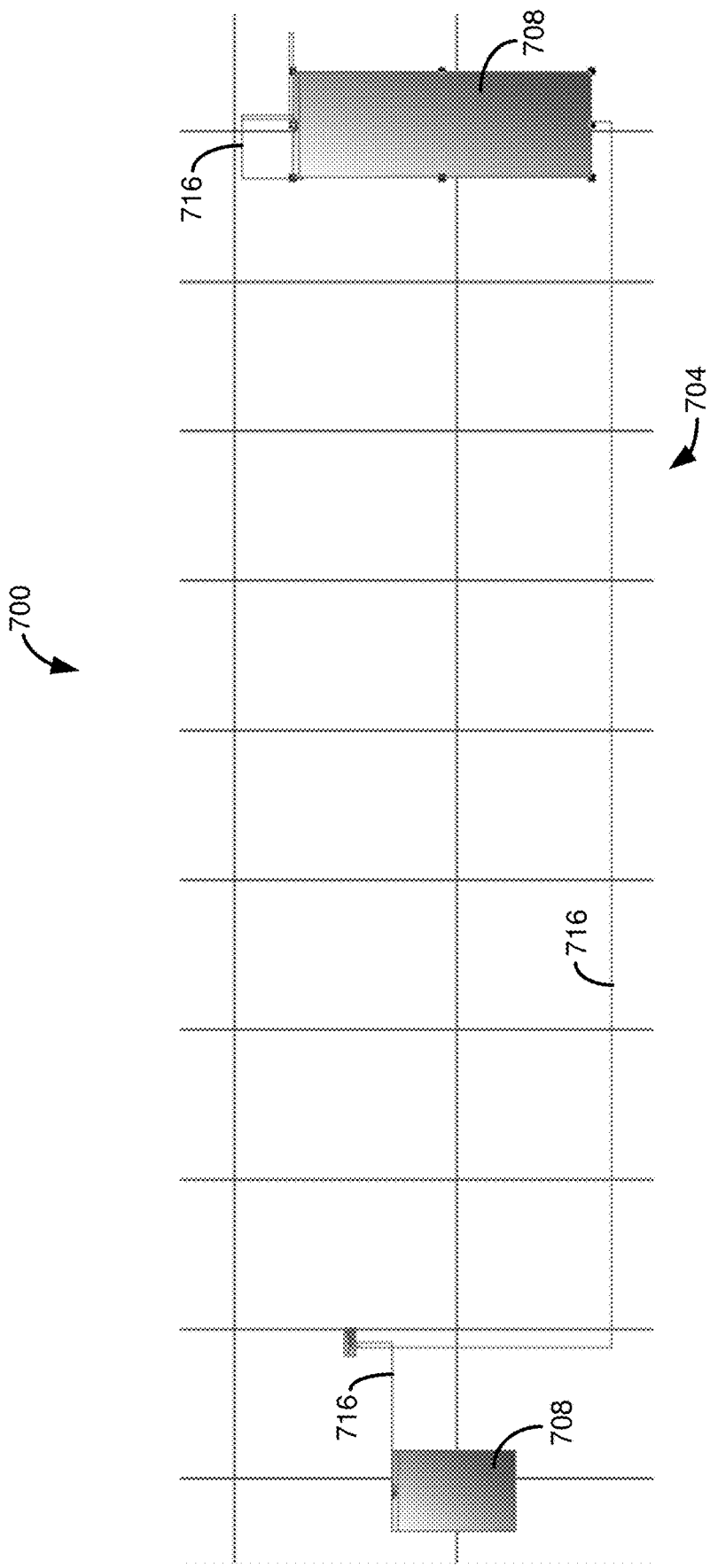
FIG. 7 is an example user interface screen illustrating how a user can eliminate paths from the paths of FIG. 4 in order to obtain a desired path.

FIG. 7 illustrates a user screen 700 that can be similar to the user interface screen 400 of FIG. 4. The screen 700 includes connections 716 for a single, selected path between target tables 708 of a graph 704. As described, an application providing, or associated with, the screen 700 can generate operations, such as SQL statements, to implement the selected pathway.

Example 6—Schema Alignment Architecture

Figure 8A:
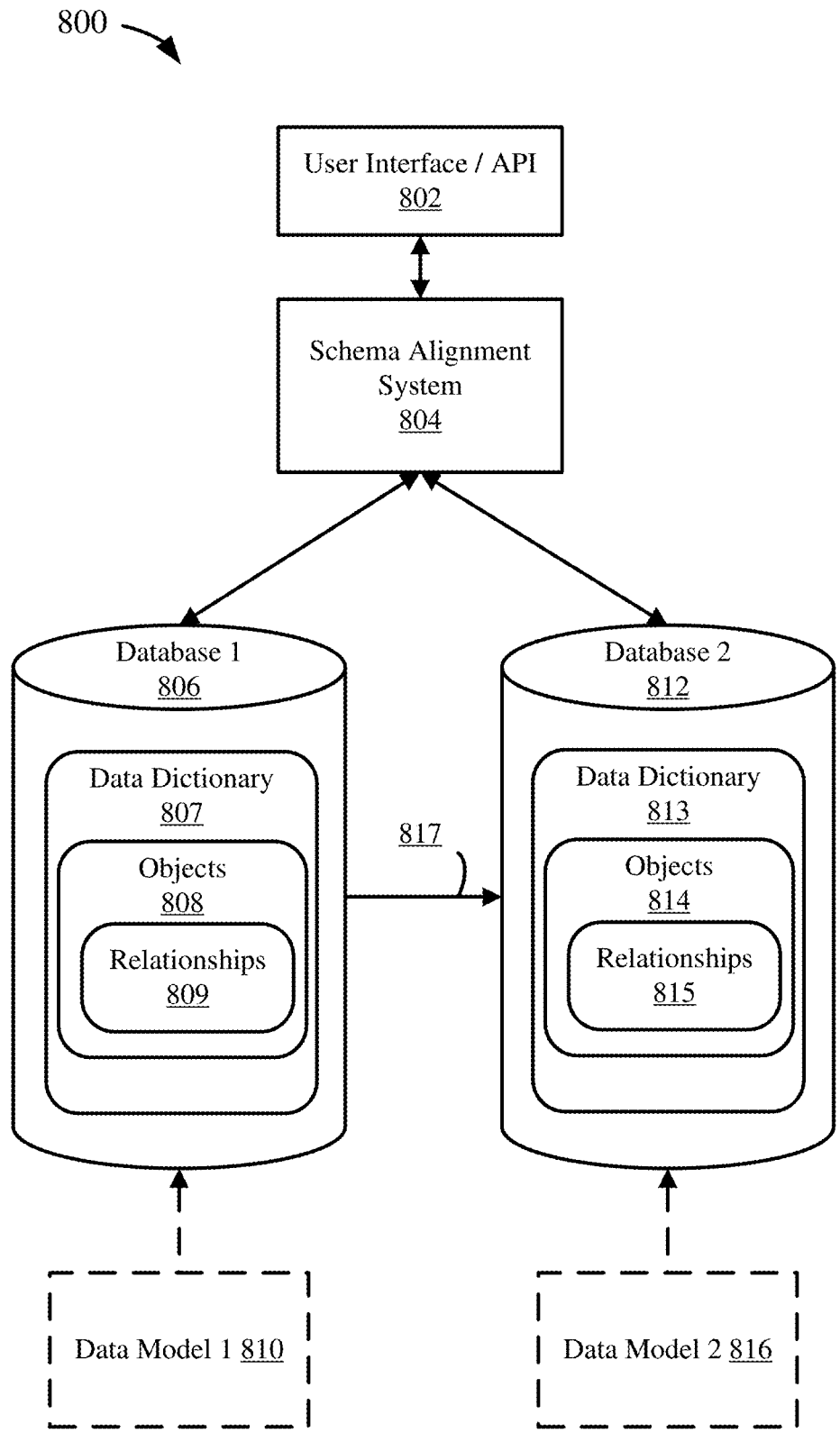
FIG. 8A is an architecture diagram depicting a system for data mapping between databases.

FIG. 8A is an architecture diagram depicting a system 800 for data mapping between databases. A first data model 810 may be implemented as database 1 806. Database 1 806 may be stored on a server or be distributed across multiple servers or virtual servers. Database 1 806 may have a data dictionary 807, which can include definitions (e.g., schema) for one or more data objects 808 (e.g., database tables or views), which definitions can define one or more relationships 809 between the data objects, including between schema elements of the data objects (such as relationships between a field of a first table and a field of a second table, such as a foreign key relationship or an association). Although not shown, the database 1 806 can include additional features, including instances of the object schemas included in the data dictionary 807, such as tables having the schema, where the tables can store data for particular records. While the data dictionary 807 is shown at the database 1 806, a data dictionary 807 can be stored at other locations, such as at a middleware layer that communicates with the database 1. Or, information corresponding to the data model 1 810 can be stored other than in a data dictionary (e.g. 807), but used in the disclosed technologies, so long as it corresponds to the data model.

The data dictionary 807 may have a schema defining database 1 806, which may include definitions for the objects 808 and relationships 809. Generally, the schema in the data dictionary 807 is an implementation representation of data model 1 810. The data dictionary 807 may also have one or more other representations of database 1 806, such as one or more graph representations of database 1, as described herein. In other embodiments, a graph representation of database 1 806 may be stored in database 1 but not in the data dictionary 807, or in another system which may be in association with database 1.

The data objects 808 may be structural components of database 1 806, such as tables (as described herein), views, or stored procedures. The data objects 808 may be linked to each other by the relationships 809. For example, a first table may be linked to a second table by a relationship. The relationship may be implemented as a foreign key field (e.g. column) in the first table defined as pointing to or linking to the second table (e.g. a given row in the second table based on the value in the foreign key field). In a graph representation of database 1 806, as described herein, such tables may be nodes and the relationships may be edges between the nodes. As used in the present disclosure, a graph may refer to a graph data structure that can be used to hold vertices and edges, or another representation of objects (e.g., tables or review) and how the objects are interrelated or connected, but need not be stored as a graph data structure.

A second data model 816 may be implemented in database 2 812, similarly to data model 1 810 and database 1 806. Database 2 812 may be stored on a server or be distributed across multiple servers or virtual servers. Database 2 812 may have a data dictionary 813, which can include definitions (e.g., schema) for one or more data objects 814 (e.g., database tables or views), which definitions can define one or more relationships 815 between the data objects, as described above. The data model 2 816, database 2 812, data objects 814, and data dictionary 813 can be implemented analogously to the components of the database 1 806.

The data dictionary 813 may have a schema defining database 2 812, which may include definitions for the objects 814 and relationships 815. Generally, the schema in the data dictionary 813 is an implementation of the data model 2 816. The data dictionary 813 may also have one or more other representations of database 2 812, such as one or more graph representations of database 2, as described herein. In other embodiments, a graph representation of database 2 812 may be stored in database 2 but not in the data dictionary 813, or in another system which may be in association with database 2.

The data objects 814 may be structural components of database 2 812, such as tables (as described herein), views, or stored procedures. The data objects 814 may be linked to each other by the relationships 815. For example, a first table may be linked to a second table by a relationship. The relationship may be implemented as a foreign key field (e.g. column) in the first table defined as pointing to or linking to the second table (e.g. a given row in the second table based on the value in the foreign key field). In a graph representation of database 2 812, as described herein, such tables may be nodes and the relationships may be edges between the nodes.

A schema alignment system 804 may provide data mapping or schema mapping functionality to map 817 a source database or data model, such as database 1 806, to a target database or data model, such as database 2 812. Generally, the schema alignment system 804 maps 817 source database 1 806 to target database 2 812 by identifying data objects 808 in database 1 and data objects 814 in database 2 that are semantically equivalent. Semantically equivalent objects may be objects that store (or are configured to store) the same or approximately the same data, or perform the same or approximately the same functionality, in whole or in part. The schema alignment system 804 may access the databases 806, 812 (or otherwise access information describing their respective data models 810, 816) to analyze them as part of the data mapping 817, which may include obtaining their schemas from their data dictionaries 807, 813 or other representations of their data models 810, 816, such as graph representations (which can be provided, or can be generated as part of the disclosed technologies, such as generating a graph representation from the data dictionaries 807, 813, or another description of the data models 810, 816). In some embodiments, the schema alignment system 804 may access one or more files representing one or both of the data models 810, 816, in place of accessing the databases 806, 812. For example, data model 1 810 may be stored as one or more UML diagram files, which may be used by the schema alignment system, or may be converted to a graph representation which may then be used by the schema alignment system 804. The schema alignment system 804 may be a stand-alone system or software program, or may be a schema alignment module as described herein.

The schema alignment system 804 may have a user interface/API 802. The user interface 802 may provide a user with a display of identified mappings between database 1 806 and database 2 812, such as a visualization of the database schemas and their alignment or mapping. The user interface/API 802 may allow a user to select a data object (e.g. out of 808) to map to one or more objects in another data model. The user interface/API 802 may allow a user to receive or display a set of options for mapping a target data object. The user interface/API 802 may allow a user to select an option for mapping, change mappings, suggest mappings, or identify anchor points for use in mapping, as described herein. The user interface/API 802 may allow another program or process to access the data mapping functionality of the schema alignment system 804, such as to obtain a set of possible mappings in database 2 812 for a target data object in database 1 806.

Example 7—Object Mappings

FIGS. 8B-E are diagrams depicting example object mappings between data models.

Figure 8B:
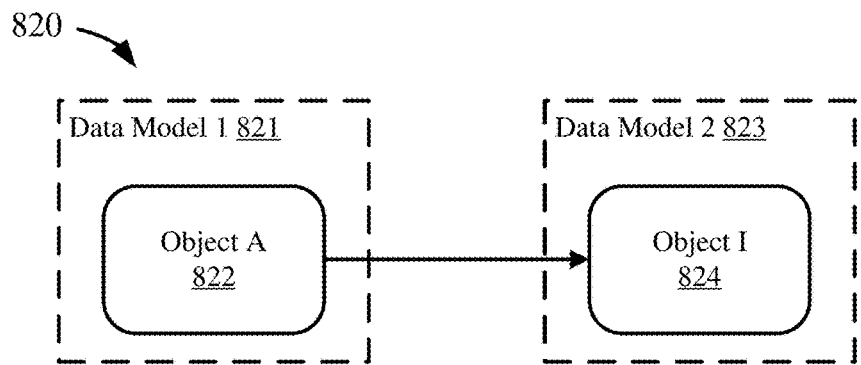
FIGS. 8B-E are diagrams depicting example object mappings between data models.

FIG. 8B illustrates an example 820 of a complete mapping. Generally, a complete mapping is a one-to-one mapping between two data objects. For this example 820, Object A 822, in data model 1 821, is mapped to Object I 824, in data model 2 823. Thus, because the mapping from Object A 822 to Object I 824 is only between those two objects, it is a complete mapping.

Figure 8C:
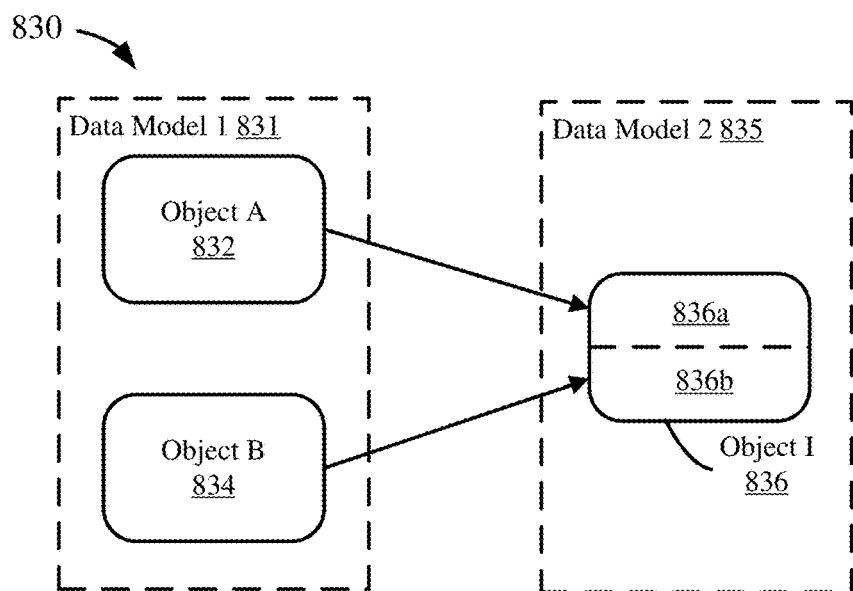

FIG. 8C illustrates an example 830 of an assembling mapping. Generally, an assembling mapping is a many-to-one mapping between three or more data objects, such as data maintained in multiple source tables being maintained at a single (or, in any event, smaller number) of tables in a target system. An assembling mapping may assemble two or more source objects, which together map to a single target object. For this example 830, Object A 832 and Object B 834, both in data model 1 831, are mapped to Object I 836, in data model 2 835. Object A 832 may be mapped to a portion or subset of Object I 836a, while Object B 834 may be mapped to another portion or subset of Object I 836b. The portions 836a, 836b may be non-overlapping or may overlap in part. Thus, the mapping from Object A 832 and Object B 834 to Object I 836 is an assembling mapping because Objects A and B are both used (assembled) to map to Object I.

Figure 8D:
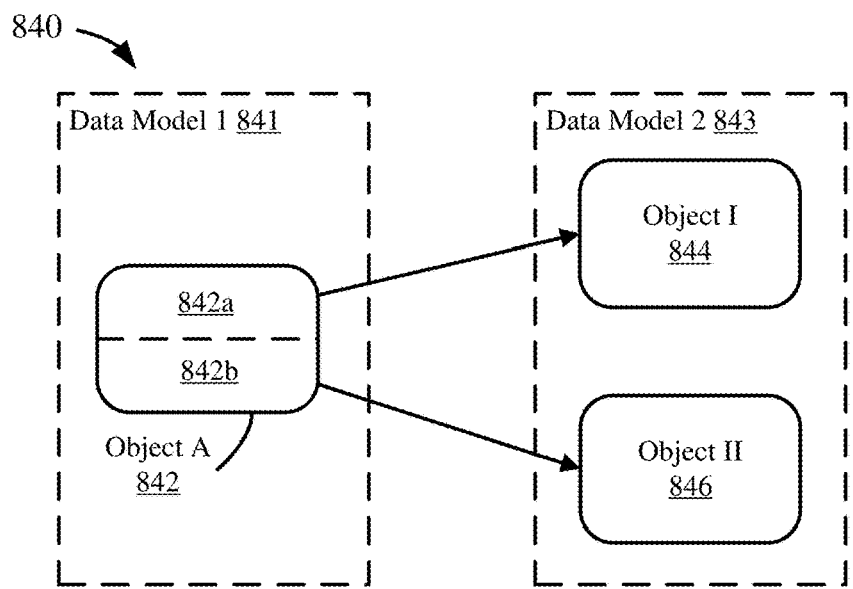

FIG. 8D illustrates an example 840 of a division mapping. Generally, a division mapping is a one-to-many mapping between three or more data objects. A division mapping may divide a single source object to map it to two or more target objects. Data that is maintained in a single table at a source database system may, for instance, be maintained in multiple tables in a target database system). For this example 840, Object A 842, in data model 1 841, may be mapped to both Object I 844 and Object II 846, both in data model 2 843. A portion or subset of Object A 842a may be mapped to Object I 844, while another portion or subset of Object A 842b may be mapped to Object II 846. The portions 842a, 842b may be non-overlapping or may overlap in part. Thus, the mapping from Object A 842 to Object I 844 and Object II 846 is a division mapping because Object A is divided to map to separate objects, Object I and Object II.

In some cases, an assembling mapping or a division mapping may be a duplicative mapping. For example, two objects may map to a single object because they are all three similar, rather than because both source objects are necessary to form a complete mapping to the target object.

Figure 8E:
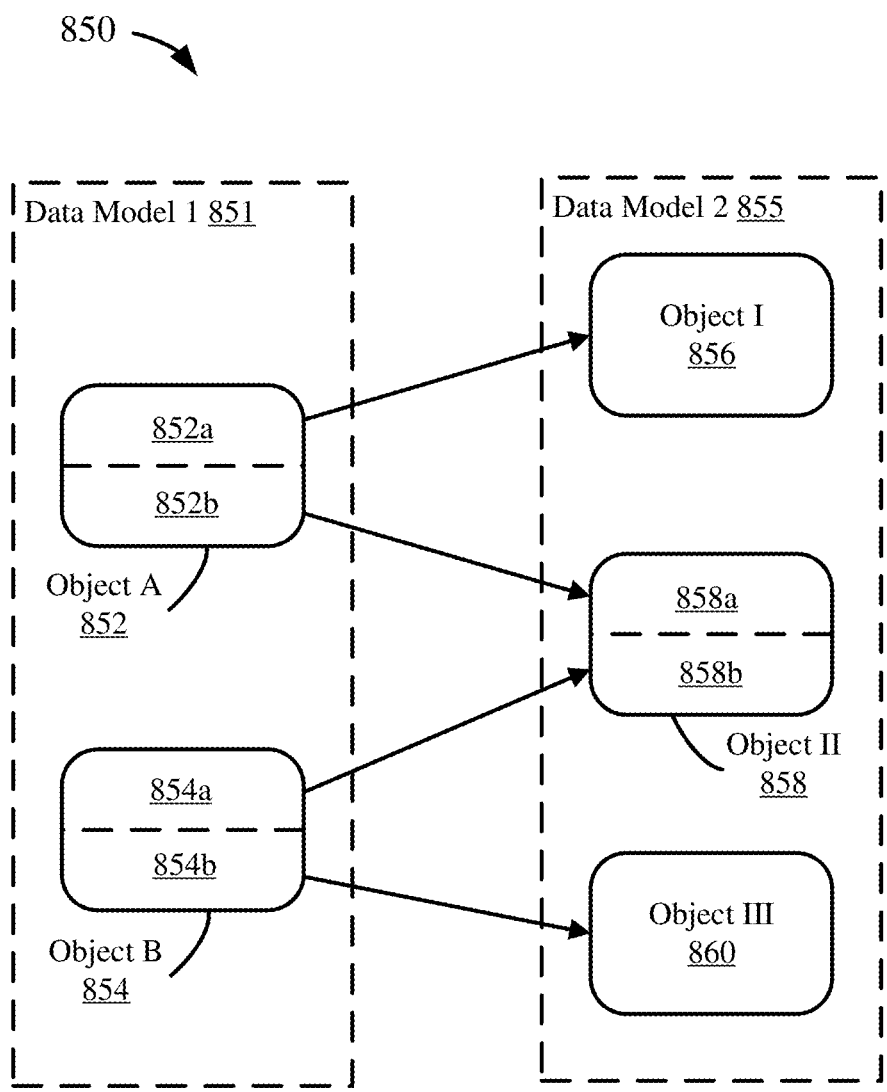

FIG. 8E illustrates an example 850 of a complex or combination mapping. Generally, assembling and division mappings may be combined when mapping one data model to another. For example, data model 1 851 may have Object A 852 and Object B 854 which may be mapped to Object I 856, Object II 858, and Object III 860 in data model 2 855. A division mapping may map a portion of Object A 852a to Object I 856 and another portion of Object A 852b to Object II 858. A division mapping may also map a portion of Object B 854a to Object II 858 and another portion of Object B 854b to Object III 860. Thus, an assembling mapping of Object A 852 and Object B 854 may be used to map to Object II 858. More specifically, a portion of Object A 852b may be mapped to a portion of Object II 858a, while a portion of Object B 854a is mapped to another portion of Object II 858b. The assembling of Object A 852 and Object B 854 may only be a portion 852b, 854a of each object. Thus, different mappings may be used in conjunction or together to form more complex mappings that may more accurately map data model 1 851 to data model 2 855.

Example 8—Anchor Points

Data mapping between databases may use one or more anchor points. Generally, an anchor point is a known mapping, such as a complete mapping, between an object in a source data model and an object in a target data model. Thus, an anchor point may include an identifier for an object in a first representation and an identifier for the mapped object in the second representation. An anchor point may also include identifiers for the respective data representations.

In some cases, an anchor point may be a multi-mapping anchor point between more than two objects. For example, an assembling mapping or a division mapping may be an anchor point.

In some cases, an anchor point may be determined by a human, or may be human-reviewed and confirmed. In other cases, an anchor point may be determined by a computing system, such as through a heuristic or machine-learning algorithm. Such a mapping may also be human-reviewed as well. A computer-generated mapping for an anchor point may also have an associated confidence value, which may need to meet a given threshold to qualify as (e.g. be used as) an anchor point.

Example 9—Schema Alignment Process

Figure 9A:
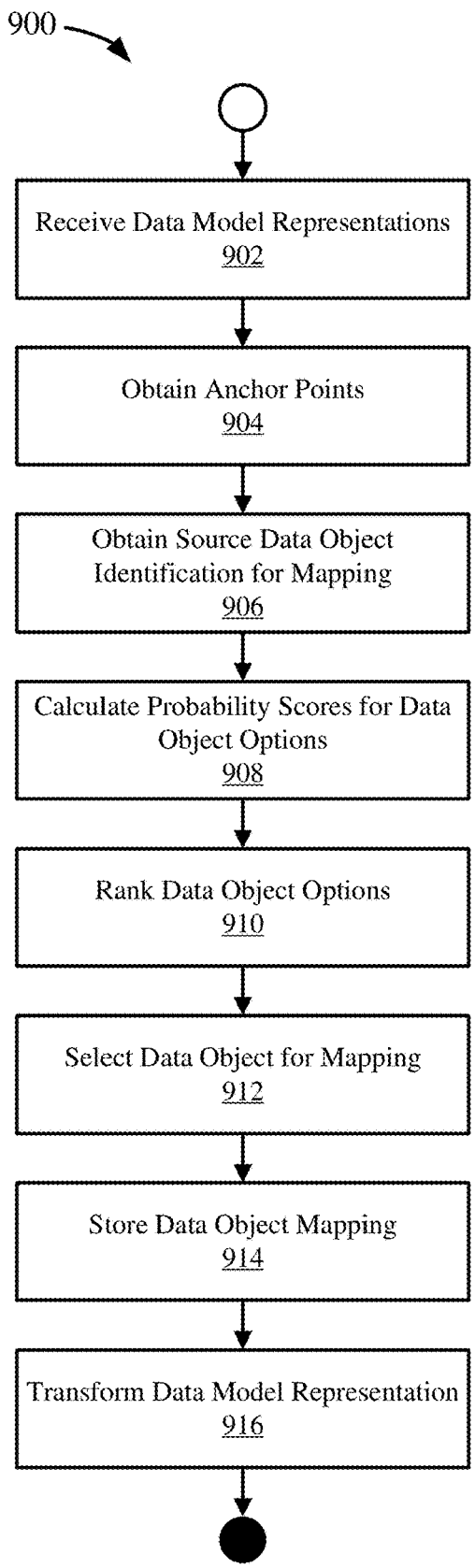
FIG. 9A is a flowchart illustrating a process for data object mapping.

FIG. 9A is a flowchart illustrating a process 900 for data object mapping. The process 900 generally maps a data object in a source data model representation (or in some cases, multiple data objects from the source data model) to one or more data objects in a target data model representation. The process 900 may be performed iteratively to map all data objects in the source representation to data objects in the target representation. Performing the process 900 iteratively may include mapping a first data object in the source presentation, and then selecting the next source data object for mapping (e.g at step 906) and repeating the remaining steps to map that object, and so on.

Data model representations are received at 902. Generally, two data model representations are received, a source representation and a target representation. Receiving the data model representations at 902 may include receiving identifiers for the data model representations, which may be used to access the data model representations. A location value may be provided along with a data model identifier, in some cases. In other embodiments, receiving the data model representations at 902 may include receiving indicators to access a database to obtain the data model representations. In other embodiments, the data model representations themselves may be received at 902. For example, graph representations of the data models may be received (or otherwise obtained) at 902.

One or more anchor points for the source and target representations may be obtained at 904. The anchor points may be obtained from a user via a user interface. Alternatively or additionally, the anchor points may be obtained from data storage of previously identified anchor points, such as from a mapping file or mapping database. In some embodiments, anchor points may be obtained at 904 from a computing system, which may use a heuristic or machine-learning algorithm, to determine anchor points between the data representations. In some cases, multiple anchor points may be obtained from different sources at 904. For example, an anchor point may be provided by a user through a user interface, while an additional anchor point, that was previously identified, may be obtained from a mapping file. In some embodiments, one or more anchor points obtained at 904 may be mappings previously determined through this process 900. For example, such previously determined mappings may also have a confidence value, which may qualify them as anchor points if they satisfy (e.g. exceed) a threshold.

An identification of a source data object for mapping may be obtained at 906. The source data object identified at 906 may be the object for mapping from the source representation to the target representation. Generally, an identifier for the source data object to map is obtained at 906. Obtaining the source data object at 906 may be accomplished through a user interface, such as by a user. Alternatively or additionally, a source data object may be obtained at 906 programmatically, such as by selecting the next data object in the source representation not mapped (or selecting the next object to map based on one or more criteria or an algorithm or set of selection rules).

Probability scores may be calculated at 908 for the data object options for mapping to the source data object identified at 906. Generally, the data object options, to which the source data object may be mapped, are all data objects in the target representation. In some cases, the data object options in the target representation may not include anchor points, or, in other cases, already mapped data objects (or both). A probability score may indicate the probability or likelihood that a given data object in the target representation should be mapped to the identified source data object. A structural score algorithm may be used to calculate the probability scores for the data object options. Such a structural algorithm may analyze the placement of the data object options in the target representation with respect to the anchor points, compared to the source data object's placement in the source representation with respect to the anchor points. Specifically, process 920 shown in FIG. 9B may be used to calculate the probability scores at 908.

The data object options may be ranked at 910 based on their probability scores. Ranking may include generating a list of the data object options and sorting the data object options. In some cases, further processing on the ranked data object options may be performed at 910. For example, only options with a probability score meeting a given threshold may be kept on the list while any options not meeting the threshold may be removed. In other cases, only the options with the best probability score may be kept while others are removed, or options with the two best probability scores are kept (and so on). Other ranking rules may be applied as well at 910. Ranking can include selecting a single candidate, when only one exists, or selecting a single most probable candidate from multiple potential candidates.

A data object is selected at 912 for mapping to the source data object identified at 906. Generally, the data object selected at 912 is selected from the ranked data object options from 910. In some cases, multiple data objects may be selected from the data object options to create a more complex mapping, such as a division mapping, as described herein. Selecting the data object at 912 may include providing the ranked data object options to a user, such as through a user interface, and receiving a selection from the user. In some embodiments, selecting the data object at 912 may be accomplished programmatically, such as by selecting based on criteria or rules. For example, the data object with the best probability score may be selected.

In other embodiments, selecting the data object at 912 may include analyzing the ranked data object options using a heuristic or machine-learning algorithm to select the data object option for mapping. In such cases, the entire set of ranked data object options may be provided to the algorithm, or a subset of the ranked data object options (e.g. the first 10,000 options, the options with the best three scores, etc.). Analyzing the data object options for selection may include providing the ranked set of data object options to a heuristic or machine-learning algorithm, such as calling a function for the analysis and providing the ranked data object options as arguments to the function, or making an API call to another system or service for selecting the data object option from the ranked data object options. In some embodiments, a machine-learning algorithm may be effective at selecting data object options for mapping when provided a smaller set of options, such as may be determined here or at step 910, with scores, such as the probability scores calculated at 908. In these embodiments, the current process 900 may provide an improved set of options to another analytical process or algorithm which may perform better in selecting based on the set of options and scores generated through this process. In this way, this process 900 for schema alignment may be integrated with other machine-learning or heuristic (e.g., natural language) processes to improve performance by obtaining better data mapping selections.

The selected target data object for the mapping may, along with its source data object counterpart, be used as an anchor point for future data mapping between the source and target representations. In other cases, the mapped objects are not used as anchor points, or may be used as anchor points if a mapping confidence value satisfies a threshold. When multiple anchor points are used, the anchor points can be used to assign a confidence value to a mapping, including weighting anchor points differently. That is, for example, for a second object to be mapped, the second object can be mapped using the first anchor point, the second (calculated) anchor point, or both anchor points (as will be further described). In the case that the first and second anchor points are individually evaluated, further mappings can be tracked, and optionally ranked or assigned confidence values, based on the source of the anchor point (e.g., calculated or user-defined) or based on agreement (or not) between mappings produced by the different anchor points. Further, in some cases, multiple mappings can be determined from a given graph, using a different node as a starting point, to help reduce the risk that an order in which anchor points are determined may affect a final outcome).

The data object mapping selected at 912 may be stored at 914. Storing may include writing the data mapping to a memory or other data storage, such as in a database or data mapping file. The stored data mapping may include identifiers for the source data object and the selected target data object (or objects), and may further include identifiers for the source data model or representation and the target data model or representation. In some embodiments, the data mapping may be stored in the respective data model representations, such as by setting a field in the source data object to the identifier for the mapped target data object (and vice versa). In other embodiments, the mapping may be stored as a metadata object in a metadata schema including the source data model and the target data model.

A data model representation may be transformed at 916. Transforming a data model representation may include adding one or more links between data objects such that the target mapped object has the same distances from the anchor points as its mapped source data object, or vice versa. Thus, the updated representation may be altered to have additional similar paths (e.g. links, edges, or relationships) between data objects as the other representation, without having its existing paths removed or changed.

In some embodiments, a data representation may be transformed at 916 based on the mapping selected at 912. A complete mapping may not invoke a data model transformation. An assembling mapping may invoke transformation of the source data representation, while a division mapping may invoke transformation of the target data representation.

Generally, the transformation process at 916 aligns the two data representations based on the newly identified mapping from step 912. The transformation at 916 generally adds links or edges so that the two data representations have similar links or edges.

Transforming the target representation at 916 may improve the quality of the probability scores or results (e.g. ranked data object options) generated by the process 900 in later iterations of the process. By transforming the target representation based on the mappings, the structure of the target representation more closely resembles the structure of the source representation after each iteration of the process 900, which generally makes generating the probability scores based on a comparison of the structures in each representation more accurate, and thus provide improved scores and mapping or alignment results.

In general, the source and target representations may be temporary copies of the representations for use during the schema alignment process 900. This allows the target representation to be freely transformed at 916 without altering or otherwise losing the representation of the data model or database as it is actually implemented. However, in some cases, a target or source data model can be transformed to match the other data model.

Example 10—Probability Scores Process

Figure 9B:
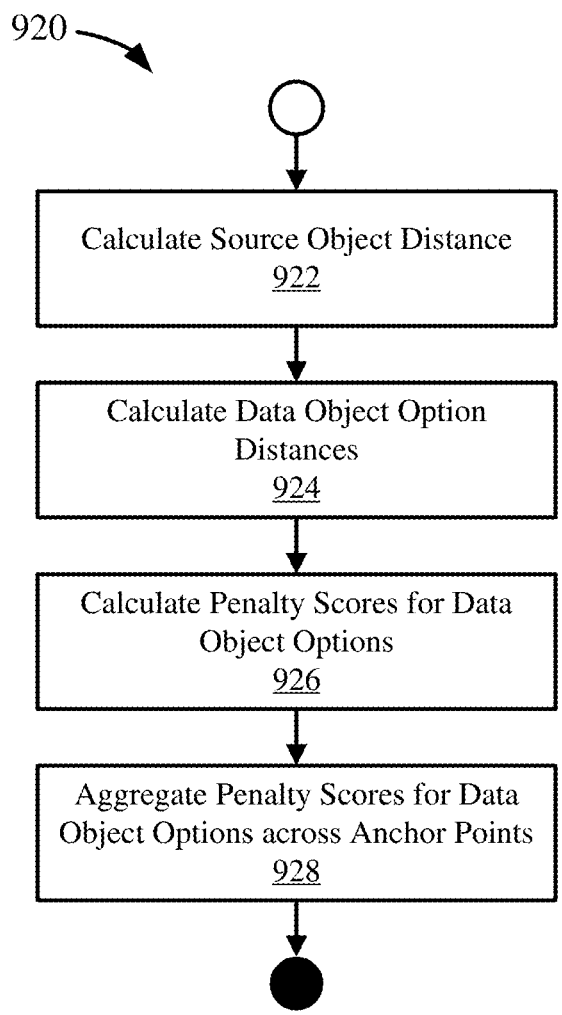
FIG. 9B is a flowchart illustrating a process for calculating mapping scores used in mapping data objects.

FIG. 9B is a flowchart illustrating a process 920 for calculating mapping scores used in mapping data objects. The process 920 may identify target data objects that are semantically equivalent to a source data object based on a structural analysis of the data objects in their respective schemas. The process 920 may be included in the process 900 when calculating probability scores at 908.

A source object distance may be calculated at 922 for a source data object in a source representation, such as may be identified in process 900 at step 906. The source object distance may be the shortest distance, or number of links (e.g. edges or relationships between nodes or objects) between the source data object and an anchor point. For example, a source data object that is directly linked to an anchor point has a distance of 1 from that anchor point. If the source data object is connected to the anchor point through another data object, the source data object has a distance of 2 from that anchor point. Calculating a source object distance at 922 may include calculating separate distance values between the source data object and each anchor point. Thus, a set of distance $\{D_{T_i}\}$ may be calculated for each anchor point i for the source data object, where $D_{T_i}$ is a given distance.

Data object option distances may be calculated at 924 for data object options in a target representation. A data object option distance may be the shortest distance between a data object option and an anchor point, similar to the source object distance. Calculating a data object option distance at 924 may include calculating separate distance values between the data object option and each anchor point. Further, data object option distances may be calculated for each data object option in the target representation. Thus, a set of a set of distances $\{\{D_{A_i}\}_j\}$ may be calculated for each anchor point i and each data object option j, where $D_{A_{ij}}$ is a distance between a given data object option j and a given anchor point i.

Calculating distances based on a multi-mapping anchor point may be accomplished by averaging the distance to each of the multi-mapped anchor points in the data representation.

Penalty scores may be calculated for the data object options at 926. Calculating a penalty score may be accomplished at least in part based on the calculated source data object distance and the data object option distance to a given anchor point. Generally, separate penalty scores are calculated for each anchor point for a given data object option, and penalty scores are calculated for each data object option. Thus, each data object option j may have a set of penalty scores $\{P_{ij}\}$ based on each anchor point i. The penalty scores may be calculated, based on a given anchor point, by subtracting the source data object distance from the data object option distance, and adding a normalization factor. Calculating the penalty scores may be described as follows:

$$P_{ij} = D_{A_i} - D_{T_i} + c \qquad \text{(equation 1)}$$

where c is a normalization factor that is obtained as follows:

$$c = \begin{cases} 0, & \text{if } \forall\, j\ P_{i_j} > 0 \\ |x|;\ x = \min_j\ (P_{i_j}), & \text{else} \end{cases} \qquad \text{(equation 2)}$$

The penalty scores for each data object option may be aggregated at 928. Generally, the set of penalty scores for the anchor points are aggregated together for a given data object option. Thus, each data object option may have a single score once the scores for the different anchor points are aggregated, which may be used to analyze the likelihood or probability that the data object option is a semantically equivalent mapping for the source data object. The penalty scores may be aggregated by averaging the penalty scores for different anchor points for a given data object. Averaging the penalty scores may be described as follows:

$$P_j = \frac{\sum_{i=1}^{|i|} P_{i_j}}{|i|} \qquad \text{(equation 3)}$$

The aggregated scores calculated at 928 may be the probability scores as used in process 900 shown in FIG. 9A.

Example 11—Schema Alignment with One Anchor Point

FIGS. 10A-D are diagrams depicting an example process 1000 for mapping a data object from a source data model to a target data model using one anchor point.

Figure 10A:
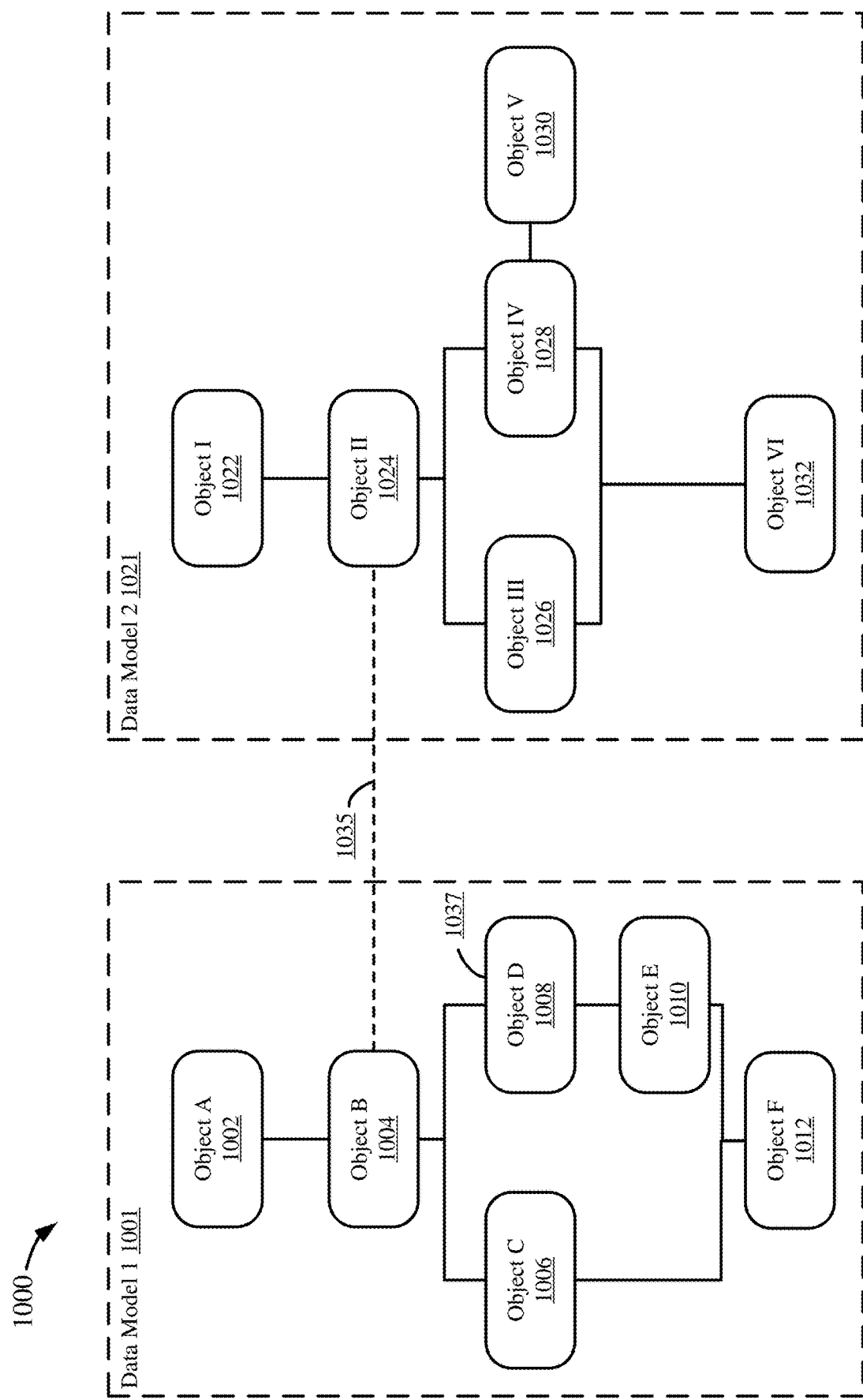
FIGS. 10A-D are diagrams depicting an example process for mapping a data object using one anchor point.

FIG. 10A illustrates the beginning of the example 1000 for data mapping, such as steps 902, 904, and 906 in process 900 shown in FIG. 9A. Data model 1 1001 may be a source data model or schema having data object A 1002, data object B 1004, data object C 1006, data object D 1008, data object E 1010, and data object F 1012, arranged as depicted. The data objects 1002, 1004, 1006, 1008, 1010, 1012 may be nodes in a representation, such as a graph representation, of data model 1 1001, and may represent underlying structural components of data model 1, such as database tables.

Similar to data model 1 1001, data model 2 1021 may be a target data model or schema having data object I 1022, data object II 1024, data object III 1026, data object IV 1028, data object V 1030, and data object VI 1032, arranged as depicted. The data objects 1022, 1024, 1026, 1028, 1030, 1032 may be nodes in a representation, such as a graph representation, of data model 2 1021, and may represent underlying structural components of data model 2, such as database tables.

For this example 1000, data model 1 1001 is being mapped to data model 2 1021 using a single anchor point 1035. Generally, data model 1 1001 and data model 2 1021 will be analyzed in the same representational format, such as a graph representation, but each may be analyzed in different formats, if so provided.

The anchor point 1035 has been identified, as described herein, between source object B 1004 and target object II 1024. Object D 1008 has been identified as the data object for mapping 1037 in the source data model 1 1001 to the target data model 2 1021.

Figure 10B:
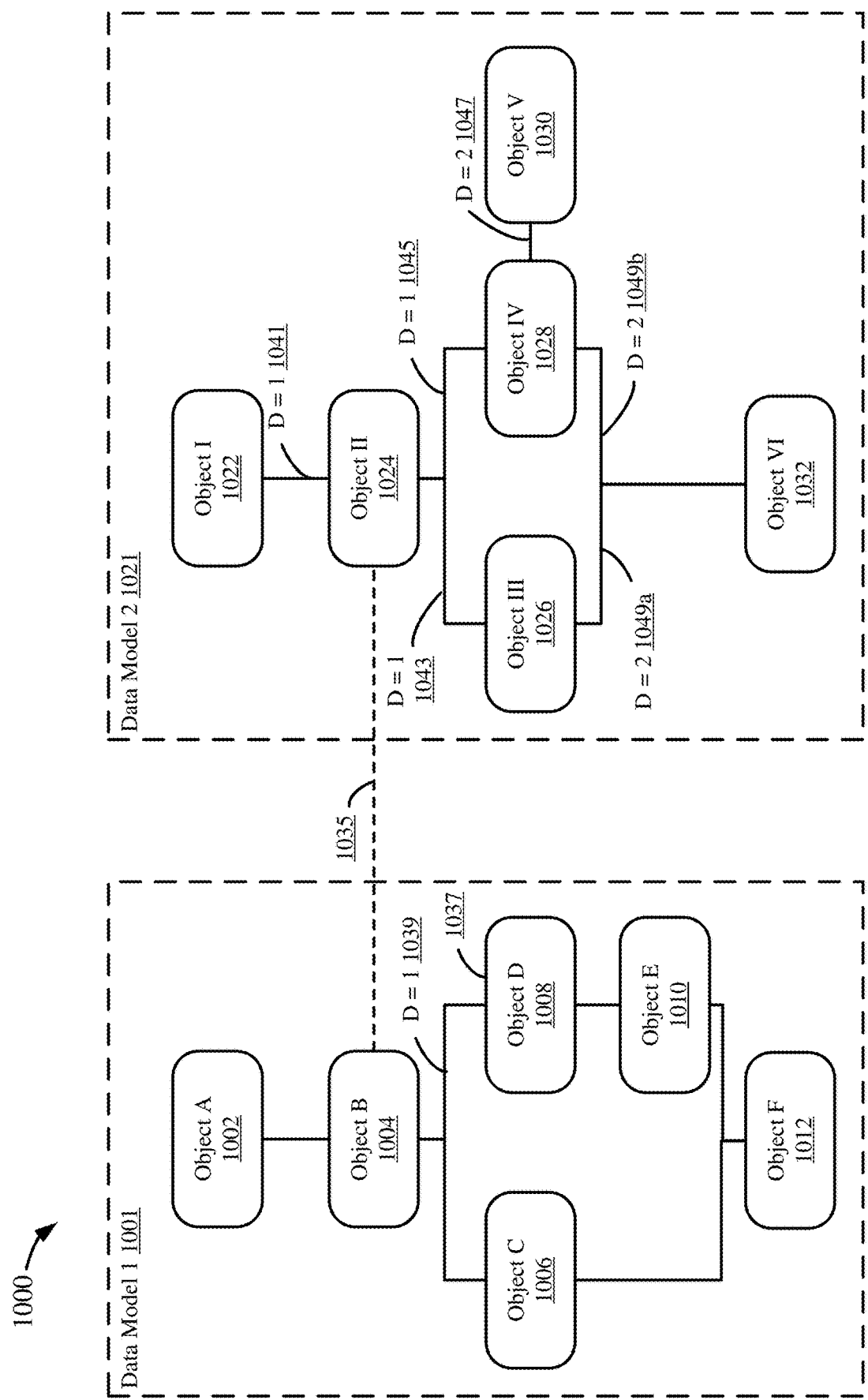

FIG. 10B continues the example 1000 for data mapping, illustrating the performance of such steps as 922 and 924 in process 920 shown in FIG. 9B. A source data object distance 1039 is calculated for the mapping data object 1037. The source data object distance 1039 is calculated as 1 (D=1) because the mapping data object 1037 is one link from the source data object, object B 1004, that is part of the anchor point 1035.

Distances are also calculated for the data object options in the target data model 2 1021. The data object options are all the data objects 1022, 1024, 1026, 1028, 1030, 1032 in the target data model 2 1021 except the data object, object II 1024, that is part of the anchor point 1035. In some embodiments, the anchor point data object II 1024 may be treated as a data object option as well. For example, a distance may be calculated for the anchor point from the several data object options to itself as an anchor point and any other anchor points, and penalty scores may be calculated based on these distances, and thus the anchor point may be ranked as an option along with the other data object options.

An object I distance 1041 is calculated as 1. An object III distance 1043 is calculated as 1. An object IV distance 1045 is calculated as 1. An object V distance 1047 is calculated as 2 because the anchor point object 1024 is two links away from object V 1030 (one link to object IV 1028 and one link to object II 1024). An object VI distance 1049a-b is calculated as 2, similar to object V 1030. There are two paths from object VI 1032 to the anchor point object 1024, one through object III 1026 with a distance 1049a of 2 and another through object IV 1028 with a distance 1049b of 2. Generally, the shortest distance is the distance used when calculating a data object's distance to an anchor point. In this example 1000 for object VI 1032, both distances 1049a, 1049b are the same and so which distance value is used does not matter.

Figure 10C:
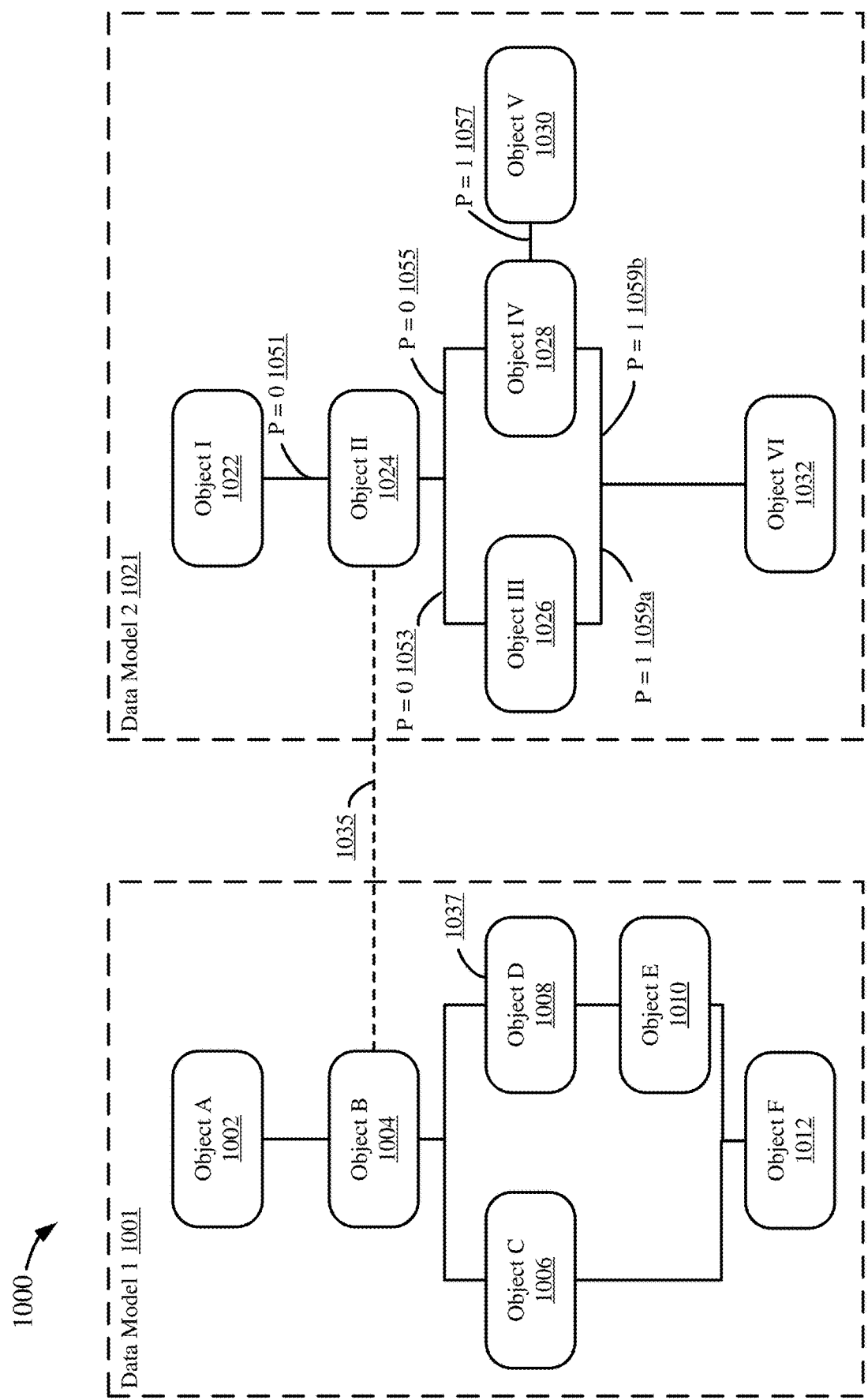

FIG. 10C continues the example 1000 for data mapping, illustrating such steps as 926 in process 920 shown in FIG. 9B. Penalty scores may be calculated for the data object options 1022, 1024, 1026, 1028, 1030, 1032 in the target data model 2 1021. The penalty scores may be calculated based on the distances 1039, 1041, 1043, 1045, 1047, 1049a-b previously determined and shown in FIG. 10B. The penalty scores may be calculated as described herein, by taking the applicable data object option distance 1041, 1043, 1045, 1047, 1049a-b and subtracting the source data object distance 1039, and adding a normalization factor (which is zero for this example 1000).

An object I penalty score 1051 is calculated as 0, based on the object I distance 1041 minus the source data object distance 1039, or 1−1=0. An object III penalty score 1053 is calculated as 0, based on the object III distance 1043 minus the source data object distance 1039, or 1−1=0. An object IV penalty score 1055 is calculated as 0, based on the object IV distance 1043 minus the source data object distance 1039, or 1−1=0. An object V penalty score 1057 is calculated as 1, based on the object V distance 1047 minus the source data object distance 1039, or 1−2=1. An object VI penalty score 1059*a-b* is calculated as 1, based on the object VI distance 1049*a* minus the source data object distance 1039, or 2−1=1 (or still 2−1=1 for the alternate distance 1049*b*).

The penalty scores 1051, 1053, 1055, 1057, 1059*a-b* are not aggregated in this example 1000 because there is only one anchor point 1035, and so only one penalty score is calculated for each data object option 1022, 1024, 1026, 1028, 1030, 1032.

Thus, object I 1022, object III 1026, and object IV 1028 have penalty scores of 0, while object V 1030 and object VI 1032 have penalty scores of 1. The objects may be sorted or ranked based on these penalty scores 1051, 1053, 1055, 1057, 1059*a-b*, and may be provided for selection of a data object option for mapping to the source mapping object 1037, as described herein. The penalty scores 1051, 1053, 1055, 1057, 1059*a-b* may be used as ranking values themselves, or they may be converted into a final ranking number, such as converting the scores to all be above zero (e.g. starting their rankings at 1). At least in general, objects with the lowest penalty score are more highly ranked (e.g. better candidates for mapping) than objects with higher penalty scores.

Figure 10D:
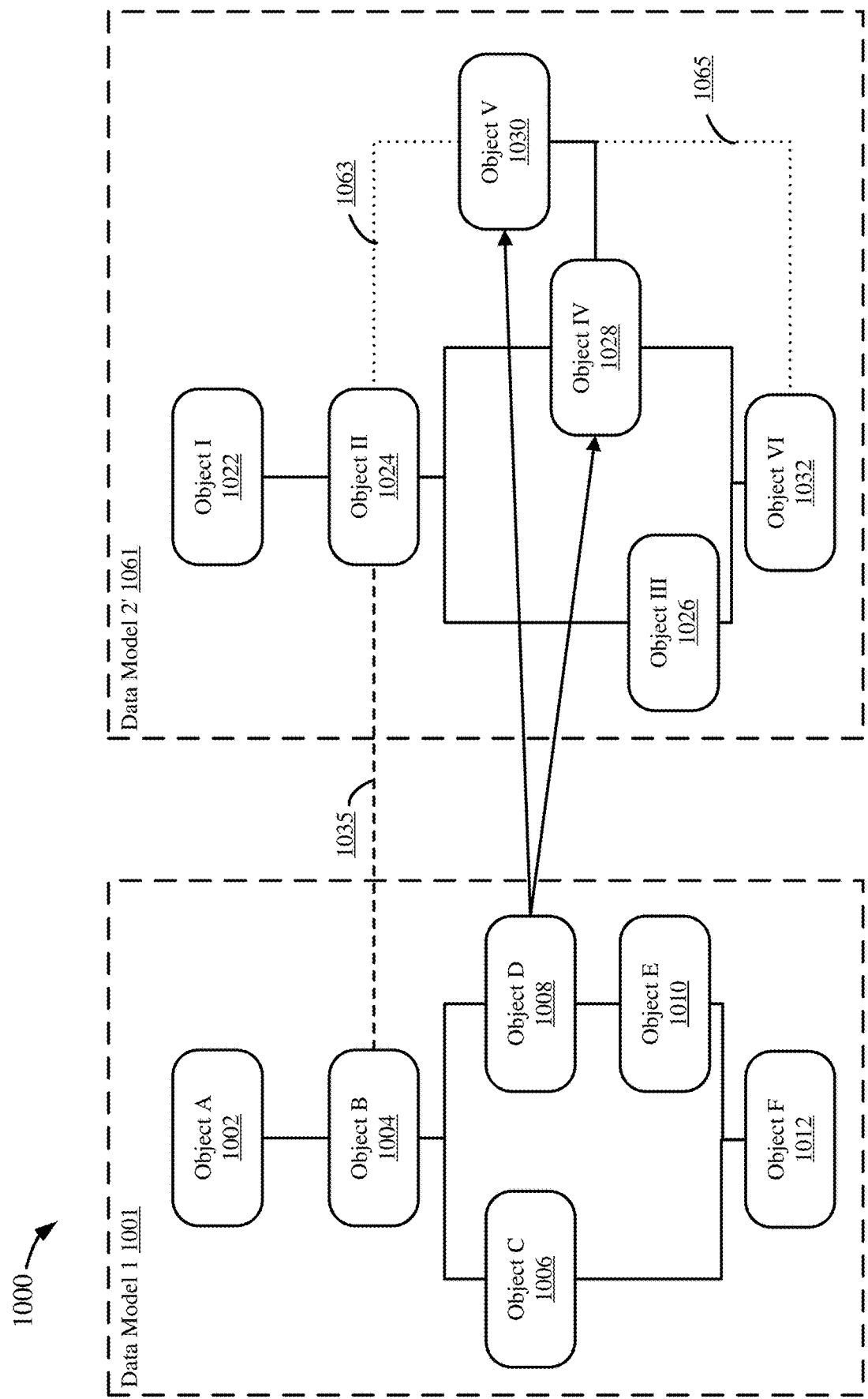

FIG. 10D ends the example 1000 for data mapping, illustrating such steps as 912 and 916 in process 900 shown in FIG. 9A. For this example, object D 1008 is mapped to object IV 1028 and object V 1030 in the target data model 2 1021, based on a selection made from the data object options and their penalty scores as shown in FIGS. 10A-C. The mapping selection may be made by a user, by one or more rules in a rule set for the data object options, or by another process, such as a heuristic or machine-learning algorithm.

Data model 2 1021 may be transformed to data model 2' 1061 based on the determined mapping for object D 1008. Transforming the data model 2 1021 may include creating additional links or relationships between data objects or nodes that match or mirror links in the other data model, data model 1 1001. Creating a link may include adding to a data object an additional link field or value to a link field with the identifier for the linked data object, and vice versa so the link is bidirectional (but, for example, could be between different elements of the data objects, such as having unidirectional links between two different pairs of attributes in a pair of mapped tables).

A link 1063 may be created between object II 1024 and object V 1030. This new link 1063 makes newly-napped object V 1030 the same distance (1) from the anchor point object 1024 as its mapped object D 1008 is from its anchor point object 1004.

A link 1065 may also be created between object VI 1032 and object V 1030. This new link 1065 gives newly-mapped object IV 1028 a same distance (2) from object VI 1032 as its mapped object D 1008 is from object F 1012.

Based on the new links 1063, 1065, data model 2' 1061 more closely resembles, or is more closely aligned with, data model 1 1001. Further data mapping, such as mapping object C 1006 may be more accurate based on the transformed data model 2' 1061.

Example 12—Schema Alignment with Two Anchor Points

FIGS. 11A-D are diagrams depicting an example process 1100 for mapping a data object from a source data model to a target data model using two anchor points. The process 1100 could represent further processing of the process 1000 of Example 11, once additional anchor points have been obtained. Although the process 1100 is described with respect to two anchor points, the process 1100 can be carried out for a larger number of anchor points.

Figure 11A:
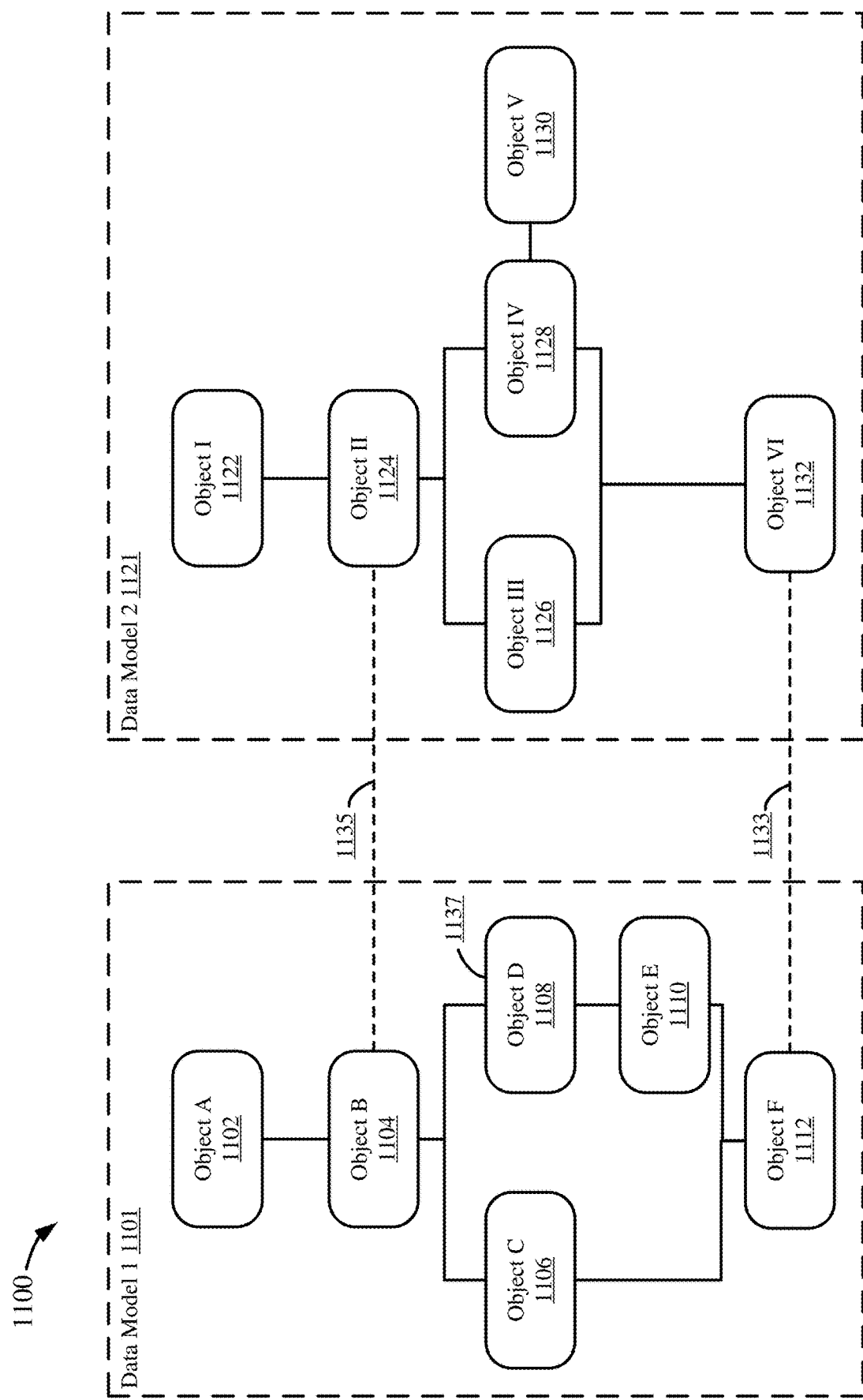
FIGS. 11A-D are diagrams depicting an example process for mapping a data object using two anchor points.

FIG. 11A illustrates the beginning of the example 1100 for data mapping, such as the performance of steps 902, 904, and 906 in process 900 shown in FIG. 9A. Data model 1 1101 may be a source data model or schema having data object A 1102, data object B 1104, data object C 1106, data object D 1108, data object E 1110, and data object F 1112, arranged as depicted. The data objects 1102, 1104, 1106, 1108, 1110, 1112 may be nodes in a representation, such as a graph representation, of data model 1 1101, and may represent underlying structural components of data model 1, such as database tables.

Similar to data model 1 1101, data model 2 1121 may be a target data model or schema having data object I 1122, data object II 1124, data object III 1126, data object IV 1128, data object V 1130, and data object VI 1132, arranged as depicted. The data objects 1122, 1124, 1126, 1128, 1130, 1132 may be nodes in a representation, such as a graph representation, of data model 2 1121, and may represent underlying structural components of data model 2, such as database tables.

For this example 1100, data model 1 1101 is being mapped to data model 2 1121 using two anchor points 1135, 1133. Generally, data model 1 1101 and data model 2 1121 will be analyzed in the same representational format, such as a graph representation, but each may be analyzed in different formats, if so provided.

The first anchor point 1135 has been identified, as described herein, between source object B 1104 and target object II 1124. The second anchor point 1133 has been identified, as described herein, between source object F 1112 and target object VI 1132. Object D 1108 has been identified as the data object for mapping 1137 in the source data model 1 1101 to the target data model 2 1121.

Figure 11B:
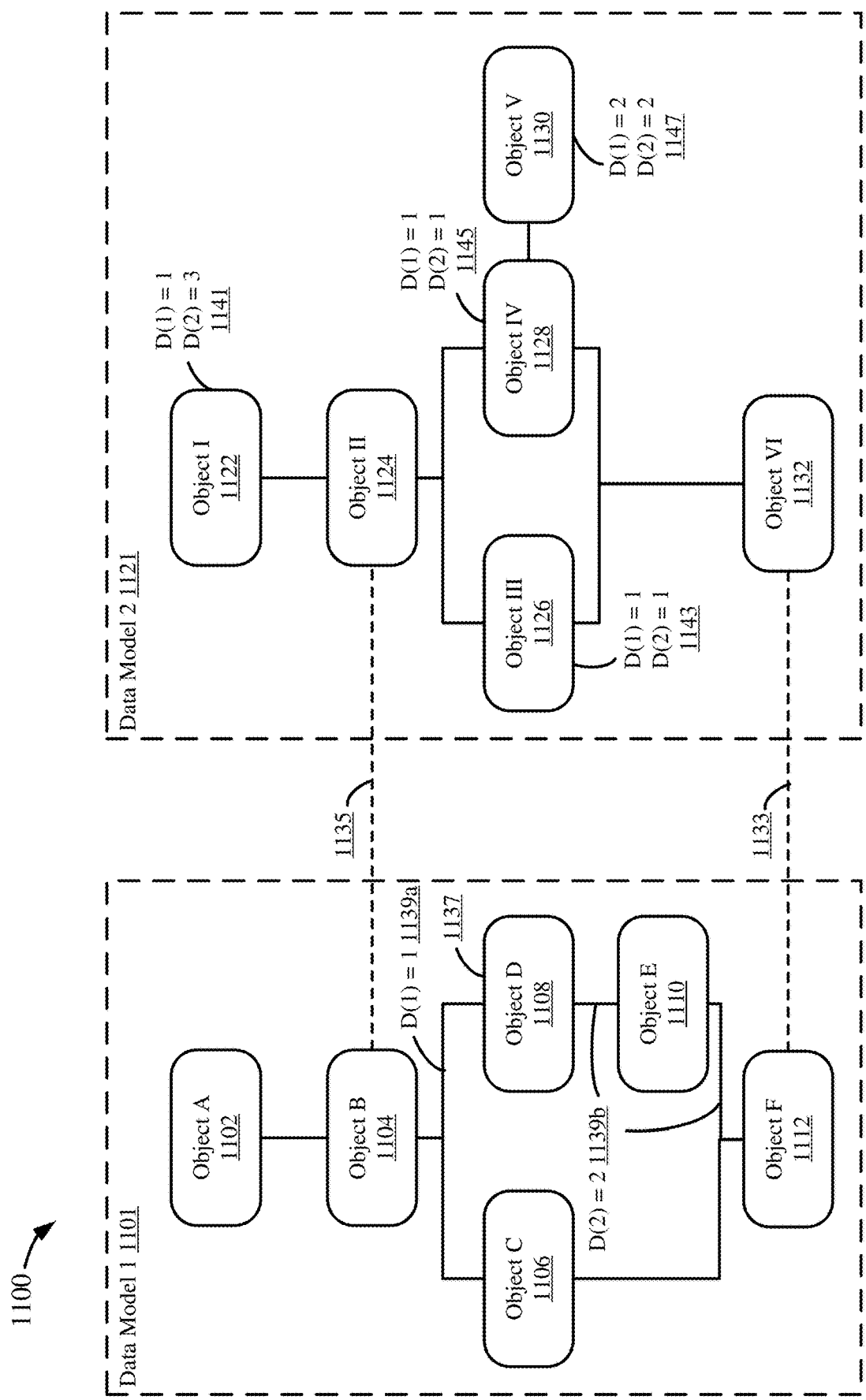

FIG. 11B continues the example 1100 for data mapping, illustrating the performance of such steps 922 and 924 in process 920 shown in FIG. 9B. A first source data object distance 1139*a* is calculated for the mapping data object 1137 to the first anchor point 1135. The first source data object distance 1139*a* is calculated as 1 (D(1)=1) because the mapping data object 1137 is one link from the source data object, object B 1104, that is part of the first anchor point 1135.

A second source data object distance 1139*b* is calculated for the mapping data object 1137 to the second anchor point 1133. The second source data object distance 1139*b* is calculated as 2 (D(2)=2) because the mapping data object 1137 is two links from the source data object, object F 1112, that is part of the second anchor point 1133.

Distances are also calculated for the data object options in the target data model 2 1121 for both of the anchor points 1135, 1133. The data object options are all the data objects 1122, 1124, 1126, 1128, 1130 in the target data model 2 1121 except the data objects, object II 1124 and object VI 1132, that are part of the anchor points 1135, 1133. In some embodiments, the anchor point data objects 1124, 1132 may be treated as data object options as well. Object I distances 1141 are calculated as 1 to the first anchor point 1135 (D(1)=1) and as 3 to the second anchor point 1133 (D(2)=3). Object III distances 1143 are calculated as 1 to the first anchor point 1135 (D(1)=1) and as 1 to the second anchor point 1133 (D(2)=1). Object IV distances 1145 are calculated as 1 to the first anchor point 1135 (D(1)=1) and as 1 to the second anchor point 1133 (D(2)=1). Object V distances 1147 are calculated as 2 to the first anchor point 1135 (D(1)=2), because the anchor point object 1124 is two links away from object V (one link to object IV 1128 and one link to object II 1124), and as 2 to the second anchor point 1133 (D(2)=2), for similar reasons. Generally, the shortest distance is the distance used when calculating a data object's distance to an anchor point.

Figure 11C:
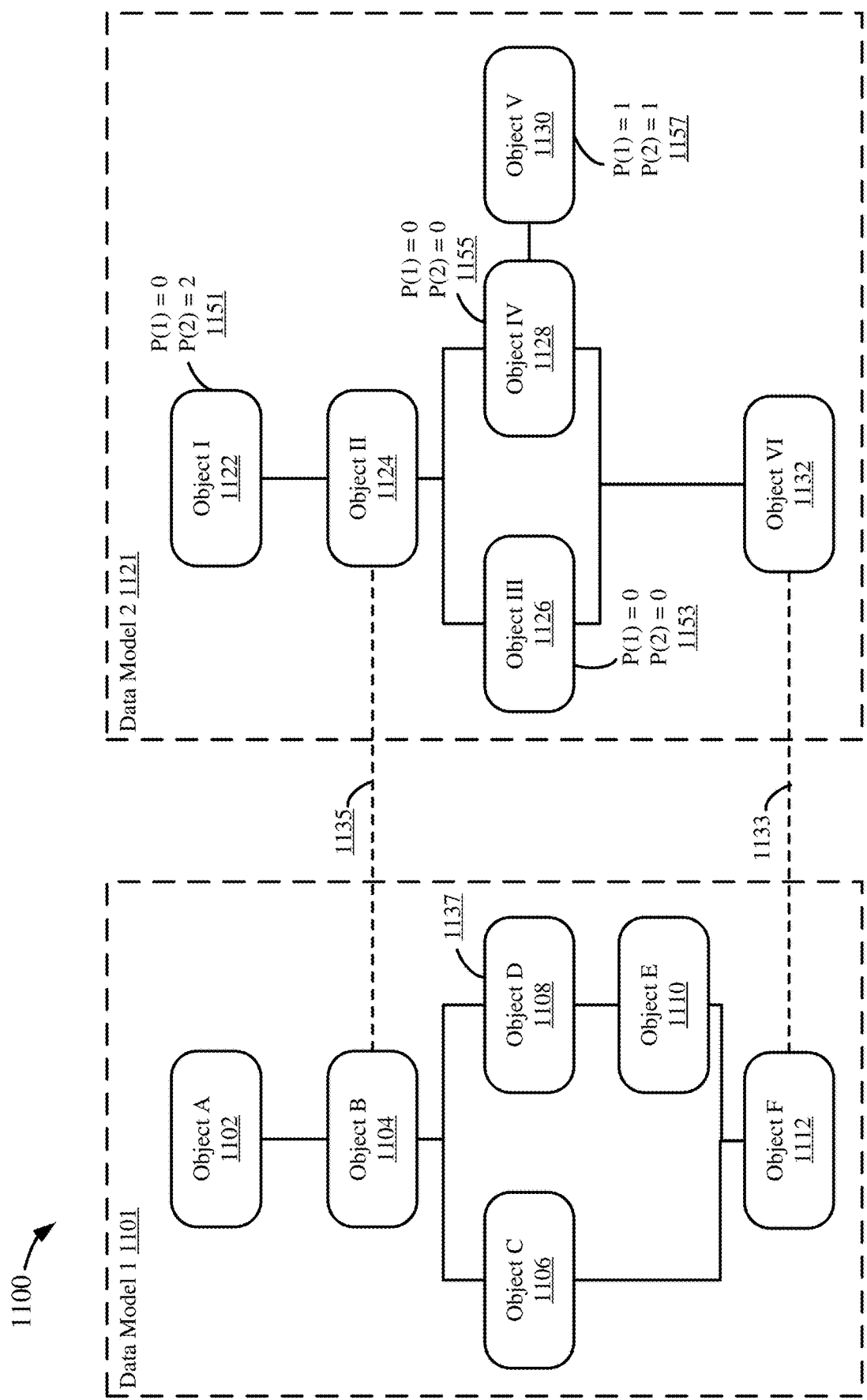

FIG. 11C continues the example 1100 for data mapping, illustrating such steps as 926 in process 920 shown in FIG. 9B. Penalty scores may be calculated for the data object options 1122, 1124, 1126, 1128, 1130 in the target data model 2 1121. The penalty scores may be calculated based on the distances 1139a-b, 1141, 1143, 1145, 1147, 1049 previously determined and shown in FIG. 10B. The penalty scores may be calculated as described herein, by taking the applicable data object option distance 1141, 1143, 1145, 1147 and subtracting the source data object distance 1139a-b, and adding a normalization factor (which is zero for this example 1100). A normalization factor may be used for large data models, where distances, and hence penalty scores, may be large. In such cases, a normalization factor may be useful to ensure that the penalty scores remain within a specific or known range, such as zero to one. A normalization factor may also be useful when comparing the results of schema alignment amongst may different data models, which may be very different and vary in size. In such cases, the normalization factor may be useful to make the results (e.g. penalty scores) comparable.

Object I penalty scores 1151 are calculated as 0 for the first anchor point 1135, based on the object I distance 1141 for the first anchor point minus the first source data object distance 1139a (1−1=0), and as 2 for the second anchor point 1133, based on the object I distance 1141 for the second anchor point minus the second source data object distance 1139b (3−1=2). Object III penalty scores 1153 are calculated as 0 for the first anchor point 1135, based on the object III distance 1143 for the first anchor point minus the first source data object distance 1139a (1−1=0), and as 0 for the second anchor point 1133, based on the object III distance 1143 for the second anchor point minus the second source data object distance 1139b (1−1=0). Object IV penalty scores 1155 are calculated as 0 for the first anchor point 1135, based on the object IV distance 1145 for the first anchor point minus the first source data object distance 1139a (1−1=0), and as 0 for the second anchor point 1133, based on the object IV distance 1145 for the second anchor point minus the second source data object distance 1139b (1−1=0). Object V penalty scores 1157 are calculated as 1 for the first anchor point 1135, based on the object V distance 1147 for the first anchor point minus the first source data object distance 1139a (2−1=1), and as 1 for the second anchor point 1133, based on the object V distance 1147 for the second anchor point minus the second source data object distance 1139b (2−1=1).

Figure 11D:
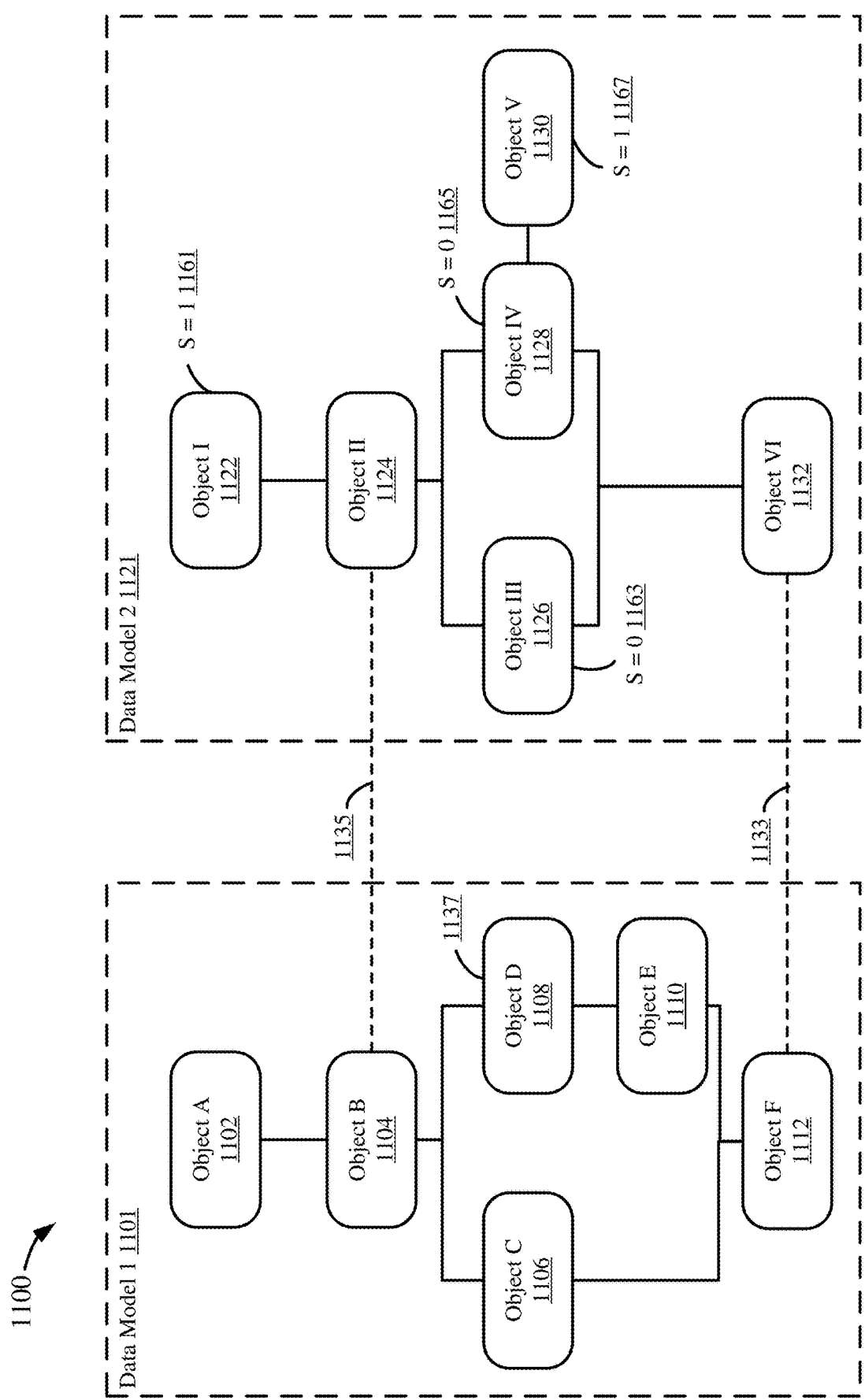

FIG. 11D ends the example 1000 for data mapping, illustrating steps such as 928 in process 920 shown in FIG. 9B. The penalty scores 1151, 1153, 1155, 1157 may be aggregated to form a single score (e.g. probability score) for the data object options 1122, 1126, 1128, 1130 in the target data model 2 1121. The penalty scores 1151, 1153, 1155, 1157 are aggregated for each data object option 1122, 1126, 1128, 1130, and generally not across different data objects. The penalty scores 1151, 1153, 1155, 1157 may be aggregated by averaging the penalty scores for a given data object option, as described herein, or by another aggregate algorithm or equation, such as a weighted average.

An object I score 1161 may be calculated as 1, based on the object I penalty scores 1151 of 0 and 2 averaged together ((0+2)/2=1). An object III score 1163 may be calculated as 0, based on the object III penalty scores 1153 of 0 and 0 averaged together ((0+0)/2=0). An object IV score 1165 may be calculated as 0, based on the object IV penalty scores 1155 of 0 and 0 averaged together ((0+0)/2=0). An object V score 1167 may be calculated as 1, based on the object V penalty scores 1157 of 1 and 1 averaged together ((1+1)/2=1).

Thus, object III 1126 and object IV 1128 have aggregated scores of 0 (e.g. final scores), while object I 1122 and object V 1130 have aggregated scores of 1 (e.g. final scores). The objects may be sorted or ranked based on these aggregated scores 1161, 1163, 1165, 1167, and may be provided for selection of a data object option for mapping to the source mapping object 1137, as described herein. The aggregated scores 1161, 1163, 1165, 1167 may be used as ranking values themselves, or they may be converted into a final ranking number, such as converting the scores to all be above zero (e.g. starting their rankings at 1).

Example 13—Schema Alignment Module Environments

Figure 12A:
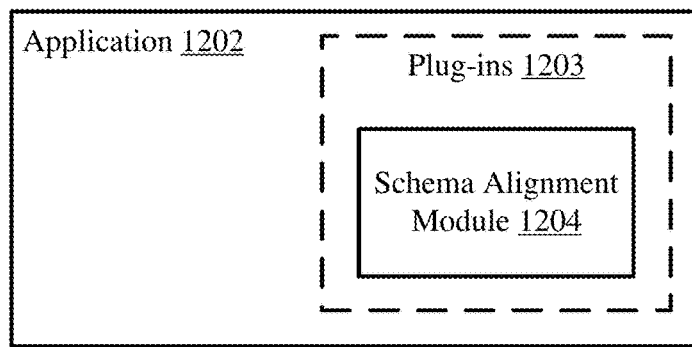
FIG. 12A is a schematic diagram depicting an application environment for a schema alignment module.

FIG. 12A is a schematic diagram depicting an application environment for a schema alignment module 1204, which may provide data model mapping and schema alignment functionality as described herein. An application 1202, such as a software application running in a computing environment, may have one or more plug-ins 1203 (or add-ins or other software extensions to programs) that add functionality to, or otherwise enhance, the application. The schema alignment module 1204 may be integrated with the application 1202; for example, the schema alignment module may be integrated as a plug-in. The schema alignment module 1204 may add functionality to the application 1202 for data model mapping and schema alignment, which may be displayed in a user interface or otherwise provided to a user. For example, the application 1202 may be a database or data modeling application, or a database management application, and the schema alignment module 1204 may be integrated with the database or data management application to provide data model mapping and schema alignment functionality.

Figure 12B:
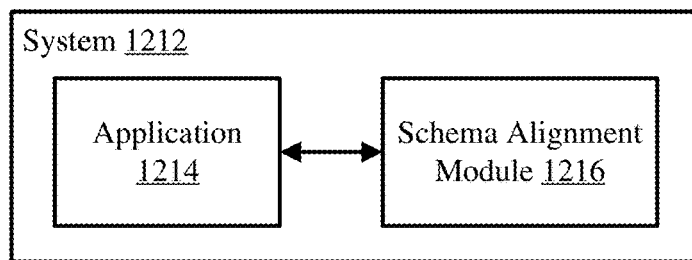
FIG. 12B is a schematic diagram depicting a system environment for a schema alignment module.

FIG. 12B is a schematic diagram depicting a system environment for a schema alignment module 1216, which may provide data model mapping and schema alignment functionality as described herein. The schema alignment module 1216 may be integrated with a computer system 1212. The computer system 1212 may include an operating system, or otherwise be a software platform, and the schema alignment module 1216 may be an application or service running in the operating system or platform, or the schema alignment module may be integrated within the operating system or platform as a service or functionality provided through the operating system or platform. The system 1212 may be a server or other networked computer or file system. Additionally or alternatively, the schema alignment module 1216 may communicate with and provide data model mapping and schema alignment functionality, as described herein, to one or more applications 1214, such as database, data modeling, or database management applications, in the system 1212.

Figure 12C:
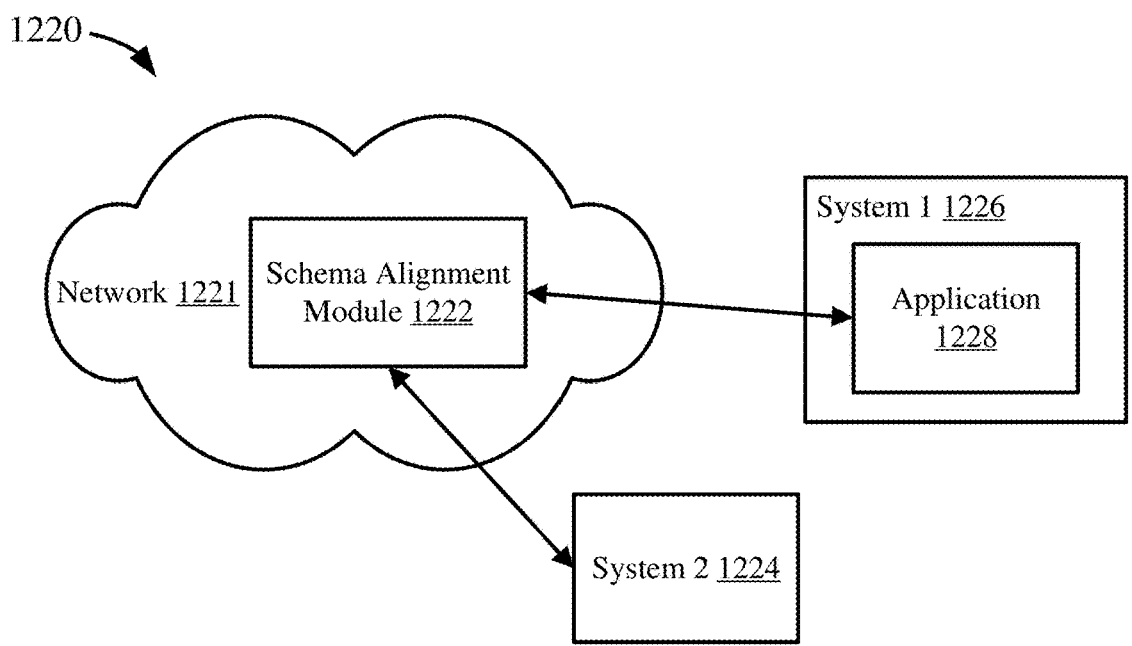
FIG. 12C is a schematic diagram depicting a network environment for a schema alignment module.

FIG. 12C is a schematic diagram depicting a network environment 1220 for a schema alignment module 1222, which may provide data model mapping and schema alignment functionality as described herein. The schema alignment module 1222 may be available on a network 1221, or integrated with a system (such as from FIG. 12B) on a network. Such a network 1221 may be a cloud network or a local network. The schema alignment module 1222 may be available as a service to other systems on the network 1221 or that have access to the network (e.g., may be on-demand software or SaaS). For example, system 2 1224 may be part of, or have access to, the network 1221, and so can utilize data model mapping and schema alignment functionality from the schema alignment module 1222. Additionally, system 1 1226, which may be part of or have access to the network 1221, may have one or more applications, such as application 1228, that may utilize data model mapping and schema alignment functionality from the schema alignment module 1222.

In these ways, the schema alignment module 1204, 1216, 1222 may be integrated into an application, a system, or a network, to provide data model mapping and schema alignment functionality as described herein.

Example 14—Additional Schema Alignment Processes

Figure 13A:
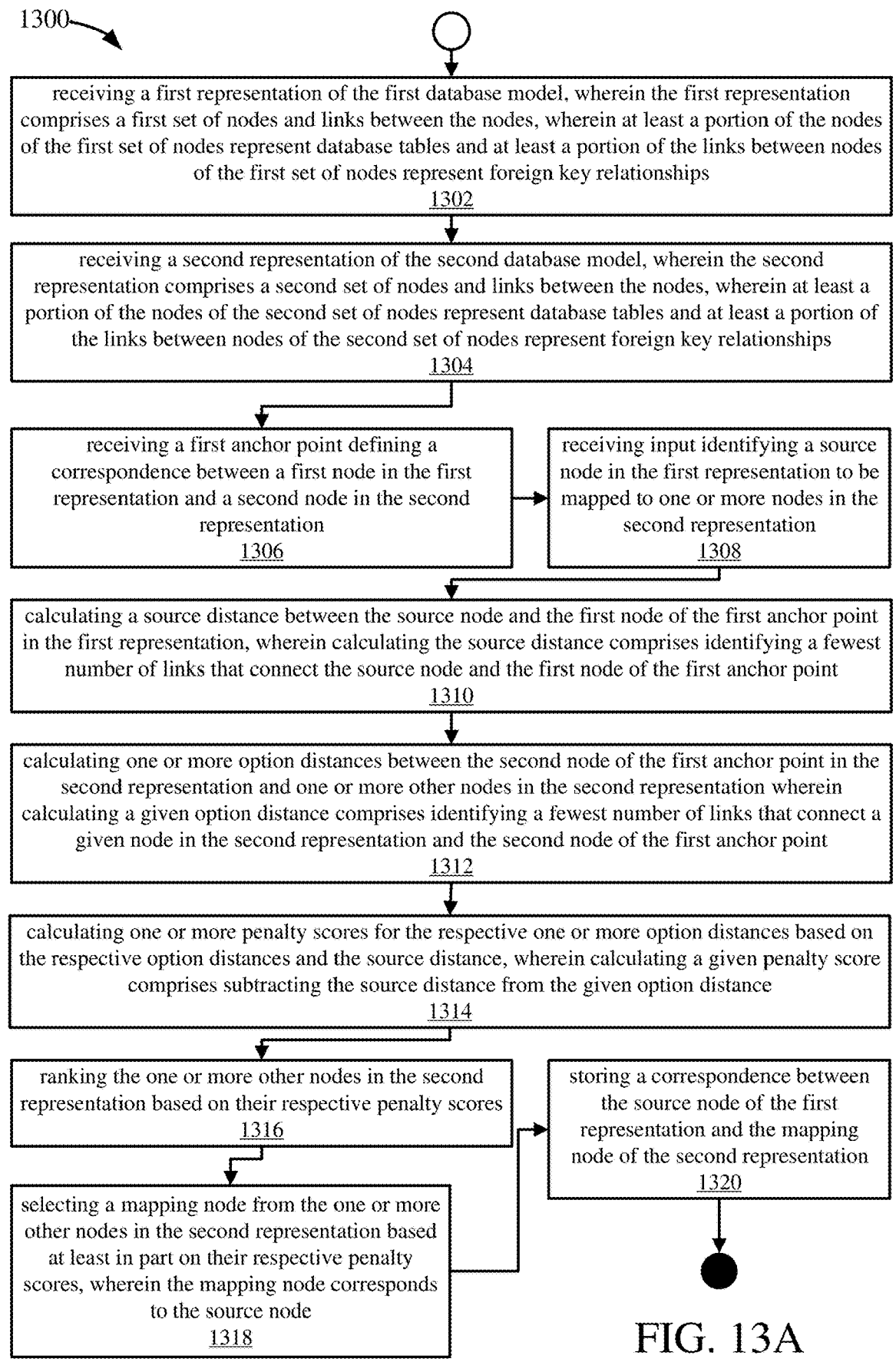
FIG. 13A illustrates a process for mapping a first database model and a second database model.

FIG. 13A illustrates a process 1300 for mapping a first database model and a second database model. The processes 1300, 1330, 1360 may be implemented by one or more computing devices comprising at least one hardware processor and one or more tangible memories coupled to the at least one hardware processor.

A first representation of the first database model may be received at 1302. The first representation may include a first set of nodes and links between the nodes. At least a portion of the nodes of the first set of nodes may represent database tables and at least a portion of the links between nodes of the first set of nodes may represent foreign key relationships. A second representation of the second database model may be received at 1304. The second representation may include a second set of nodes and links between the nodes. At least a portion of the nodes of the second set of nodes may represent database tables and at least a portion of the links between nodes of the second set of nodes may represent foreign key relationships. A first anchor point defining a correspondence between a first node in the first representation and a second node in the second representation may be received at 1306. Input identifying a source node in the first representation to be mapped to one or more nodes in the second representation may be received at 1308.

A source distance may be calculated at 1310 between the source node and the first node of the first anchor point in the first representation. Calculating the source distance may include identifying a fewest number of links that connect the source node and the first node of the first anchor point. One or more option distances may be calculated at 1312 between the second node of the first anchor point in the second representation and one or more other nodes in the second representation. Calculating a given option distance may include identifying a fewest number of links that connect a given node in the second representation and the second node of the first anchor point.

One or more penalty scores may be calculated at 1314 for the respective one or more option distances based on the respective option distances and the source distance. Calculating a given penalty score may include subtracting the source distance from the given option distance. The one or more other nodes in the second representation may be ranked at 1316 based on their respective penalty scores. A mapping node may be selected at 1318 from the one or more other nodes in the second representation based at least in part on their respective penalty scores. The mapping node may correspond to the source node. A correspondence between the source node of the first representation and the mapping node of the second representation may be stored at 1320.

Figure 13B:
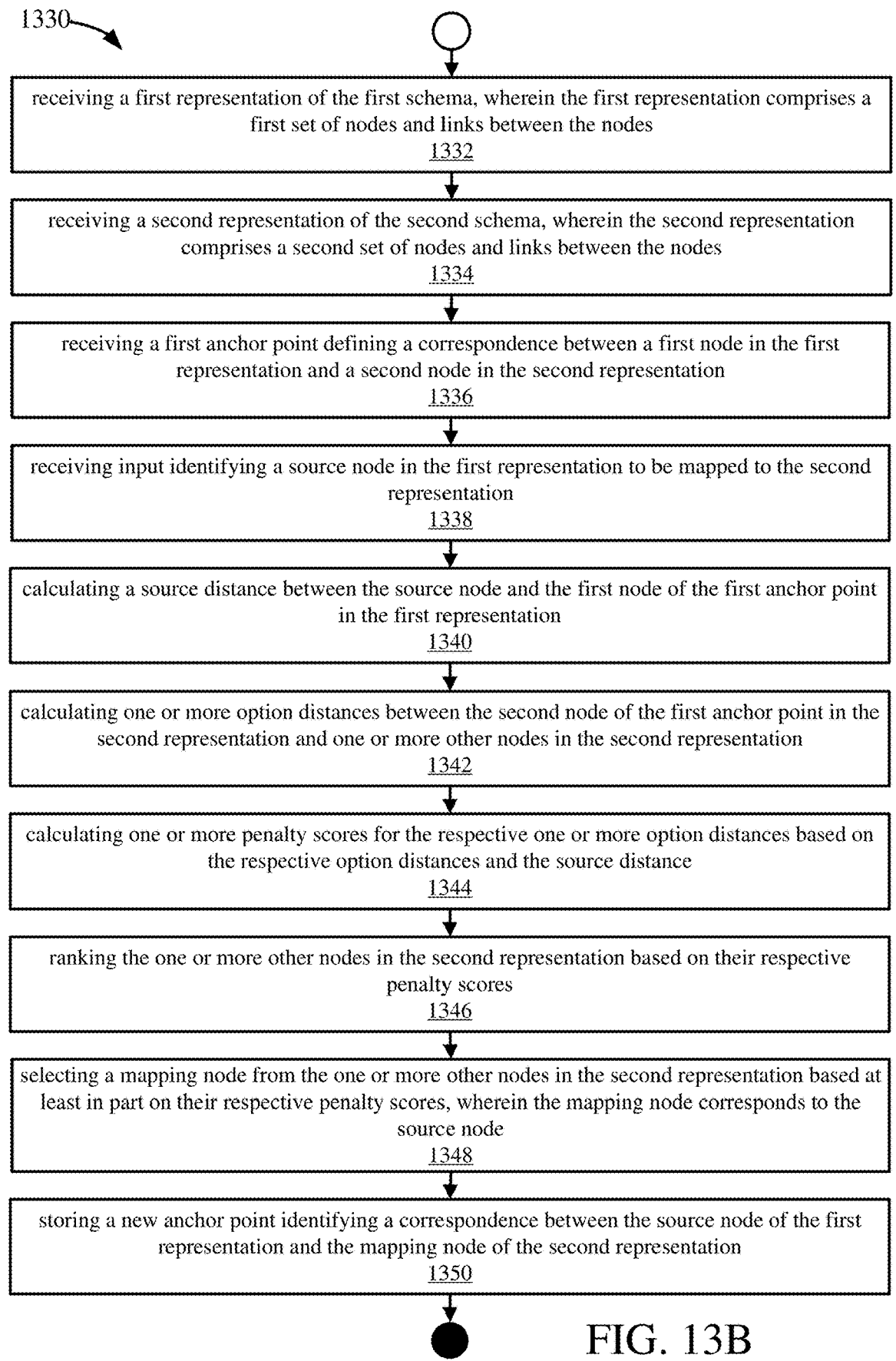
FIG. 13B illustrates a process for aligning a first schema and a second schema.

FIG. 13B illustrates a process 1330 for aligning a first schema and a second schema. The processes 1300, 1330, 1360 may be implemented by one or more tangible computer-readable storage media storing computer-executable instructions for causing a computing system to perform the method.

A first representation of the first schema may be received at 1332. The first representation may include a first set of nodes and links between the nodes. A second representation of the second schema may be received at 1334. The second representation may include a second set of nodes and links between the nodes. A first anchor point defining a correspondence between a first node in the first representation and a second node in the second representation may be received at 1336. Input identifying a source node in the first representation to be mapped to the second representation may be received at 1338.

A source distance may be calculated at 1340 between the source node and the first node of the first anchor point in the first representation. One or more option distances may be calculated at 1342 between the second node of the first anchor point in the second representation and one or more other nodes in the second representation. One or more penalty scores may be calculated at 1344 for the respective one or more option distances based on the respective option distances and the source distance.

The one or more other nodes in the second representation may be ranked at 1346 based on their respective penalty scores. A mapping node may be selected at 1348 from the one or more other nodes in the second representation based at least in part on their respective penalty scores. The mapping node may correspond to the source node. A new anchor point identifying a correspondence between the source node of the first representation and the mapping node of the second representation may be stored at 1350.

Figure 13C:
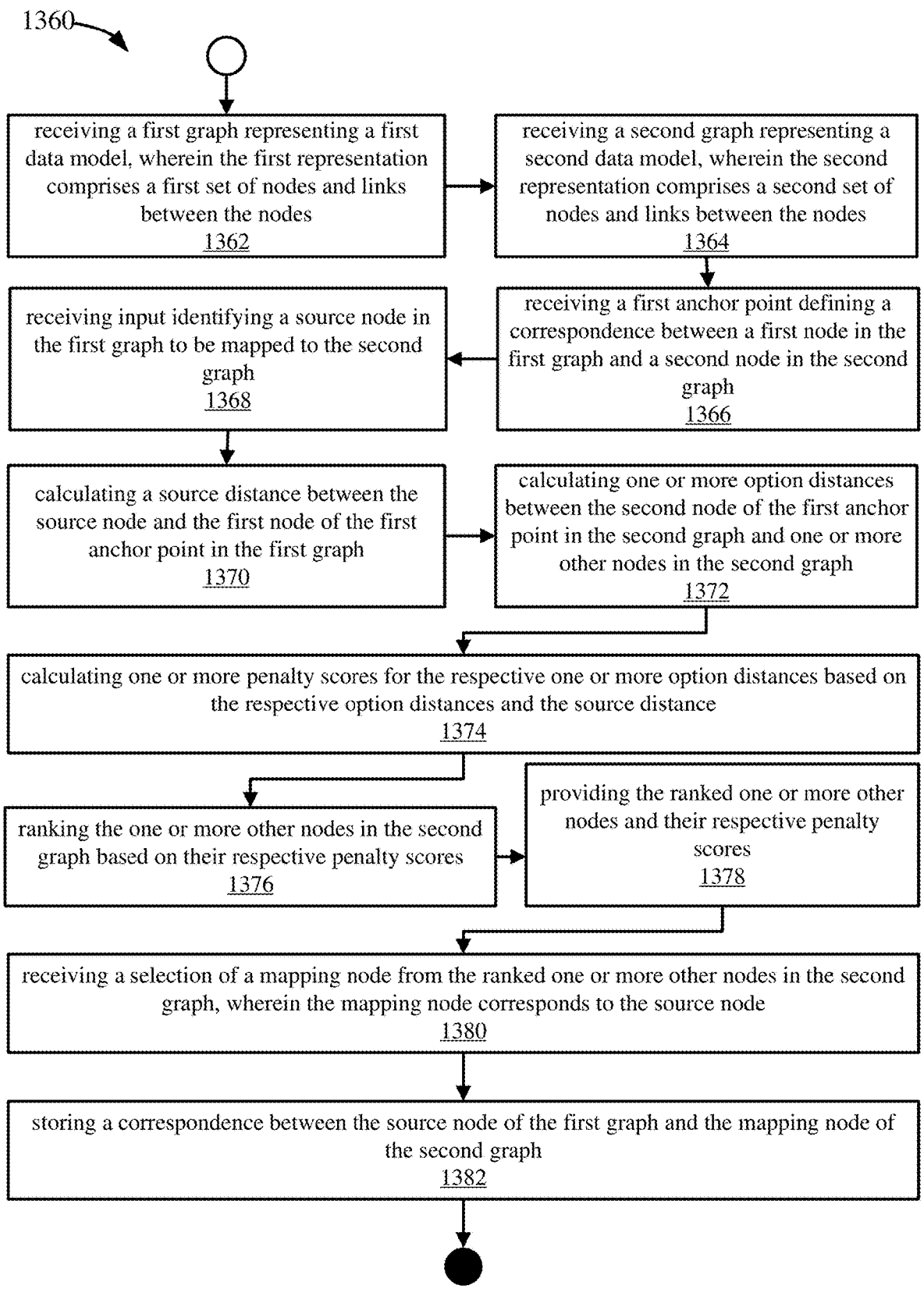
FIG. 13C illustrates a process for aligning graphs.

FIG. 13C illustrates a process 1360 for aligning graphs. The processes 1300, 1330, 1360 may be implemented in a system having one or more memories, one or more processing units coupled to the one or more memories, and one or more computer-readable storage media storing instructions that, when loaded into the one or more memories, cause the one or more processing units to perform structural data mapping operations.

A first graph representing a first data model may be received at 1362. The first representation may include a first set of nodes and links between the nodes. A second graph representing a second data model may be received at 1364. The second representation may include a second set of nodes and links between the nodes. A first anchor point defining a correspondence between a first node in the first graph and a second node in the second graph may be received at 1366. Input identifying a source node in the first graph to be mapped to the second graph may be received at 1368.

A source distance may be calculated at 1370 between the source node and the first node of the first anchor point in the first graph. One or more option distances may be calculated at 1372 between the second node of the first anchor point in the second graph and one or more other nodes in the second graph. One or more penalty scores may be calculated at 1374 for the respective one or more option distances based on the respective option distances and the source distance.

The one or more other nodes in the second graph may be ranked at 1376 based on their respective penalty scores. The ranked one or more other nodes and their respective penalty scores may be provided at 1378. A selection of a mapping node from the ranked one or more other nodes in the second graph may be received at 1380. The mapping node may correspond to the source node. A correspondence between the source node of the first graph and the mapping node of the second graph may be stored at 1382.

Example 15—Computing Systems

Figure 14:
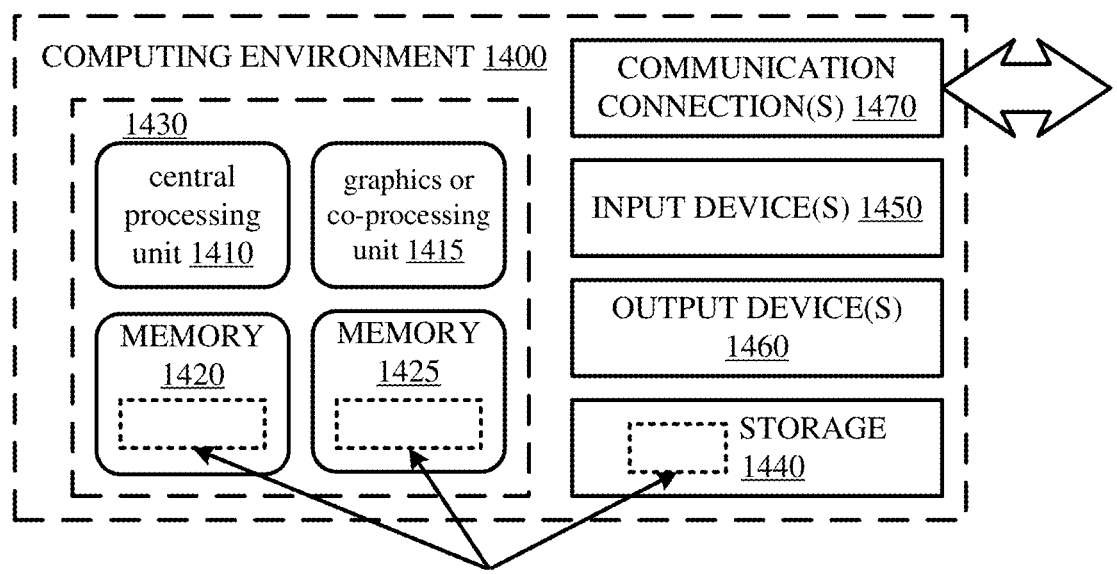
FIG. 14 is a diagram of an example computing system in which described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing components of the processes of FIGS. 9A-B and 13A-C, the systems of FIGS. 8A and 12A-C, or the databases and representations of FIGS. 1-7, 8B-E, 10A-D, and 11A-D. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415. The memory 1420, 1425, may also store settings or settings characteristics, databases, data sets, interfaces, or data models or representations shown in FIGS. 1-7, 8B-E, 10A-D, and 11A-D, systems shown in FIGS. 8A and 12A-C, or the steps of the processes shown in FIGS. 9A-B and 13A-C.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 16—Cloud Computing Environment

Figure 15:
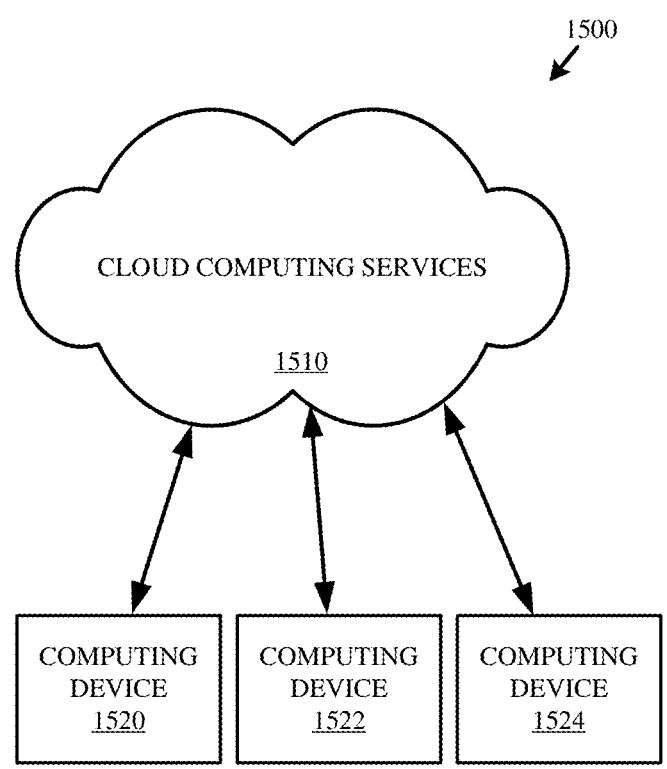
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operations (e.g., data processing, data storage, and the like).

Example 17—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by one or more computing devices comprising at least one hardware processor and one or more tangible memories coupled to the at least one hardware processor, the method comprising:

receiving a first representation of a first database model, wherein the first representation comprises a first set of nodes and links between nodes of the first set of nodes, wherein at least a portion of the nodes of the first set of nodes represent database tables and at least a portion of the links between the nodes of the first set of nodes represent foreign key relationships;

receiving a second representation of a second database model, wherein the second representation comprises a second set of nodes and links between nodes of the second set of nodes, wherein at least a portion of the nodes of the second set of nodes represent database tables and at least a portion of the links between the nodes of the second set of nodes represent foreign key relationships;

receiving a first anchor point defining a correspondence between a first node in the first representation and a second node in the second representation;

receiving input identifying a source node in the first representation to be mapped to one or more nodes in the second representation;

calculating a source distance between the source node and the first node of the first anchor point in the first representation, wherein calculating the source distance comprises identifying a fewest number of links that connect the source node and the first node of the first anchor point;

calculating one or more option distances between the second node of the first anchor point in the second representation and one or more other nodes in the second representation, wherein calculating a given option distance comprises identifying a fewest number of links that connect a given node in the second representation and the second node of the first anchor point;

calculating one or more penalty scores for the one or more option distances based on the one or more option distances and the source distance, wherein calculating a given penalty score comprises subtracting the source distance from an option distance of the one or more option distances;

ranking the one or more other nodes in the second representation based on their respective penalty scores;

selecting a mapping node from the one or more other nodes in the second representation based at least in part on their respective penalty scores, wherein the mapping node corresponds to the source node;

storing a correspondence between the source node of the first representation and the mapping node of the second representation; and transforming the second representation to align with the first representation by adding one or more links between nodes in the second representation such that the second node of the first anchor point has the same distance to the mapping node of the second representation as the first node of the first anchor point in the first representation and the source node of the first representation.

2. The method of claim 1, further comprising:

receiving a second anchor point defining a correspondence between a third node in the first representation and a fourth node in the second representation;

calculating a second source distance between the source node and the third node of the second anchor point in the first representation, wherein calculating the second source distance comprises identifying a fewest number of links that connect the source node and the third node of the second anchor point;

calculating one or more second option distances between the fourth node of the second anchor point in the second representation and the one or more other nodes in the second representation, wherein calculating a given second option distance comprises identifying a fewest number of links that connect a given second node in the second representation and the fourth node of the second anchor point;

calculating one or more second penalty scores for second option distances of the one or more second option distances based on the one or more second option distances and the second source distance, wherein calculating a given second penalty score of the one or more second penalty scores comprises subtracting the second source distance from a second option distance of the one or more second option distances; and aggregating the one or more penalty scores and the one or more second penalty scores for for nodes of the one or more other nodes in the second representation, wherein the aggregating comprises averaging a given penalty score and a corresponding second penalty score for a given node of the one or more other nodes in the second representation.

3. The method of claim 1, wherein selecting the mapping node comprises analyzing the ranked one or more other nodes in the second representation and their respective penalty scores by a machine-learning algorithm which returns the mapping node.

4. The method of claim 1, wherein selecting the mapping node comprises providing the ranked one or more other nodes in the second representation and their respective penalty scores to a user and receiving a selection of the mapping node from the user.

5. The method of claim 1, wherein the mapping node comprises a selection of two or more nodes from the ranked one or more other nodes in the second representation.

6. The method of claim 1, further comprising:

accessing a source database corresponding to the first representation;

extracting data from a first table in the source database corresponding to the source node in the first representation;

accessing a second database corresponding to the second representation;

storing the extracted data in a second table in the second database corresponding to the mapping node based on the stored correspondence between the source node and the mapping node.

7. The method of claim 1, further comprising:

generating a database view based on a first database corresponding to the first representation and a second database corresponding to the second representation, wherein data in the database view is deduplicated based on the stored correspondence between the source node and the mapping node.

8. One or more tangible computer-readable storage media storing computer-executable instructions that, when executed, cause a computing system to perform operations comprising:

receiving a first representation of a first schema, wherein the first representation comprises a first set of nodes and links between nodes of the first set of nodes, wherein at least a portion of the nodes of the first set of nodes represent database tables and at least a portion of the links between nodes of the first set of nodes represent foreign key relationships;

receiving a second representation of a second schema, wherein the second representation comprises a second set of nodes and links between nodes of the second set of nodes, wherein at least a portion of the nodes of the second set of nodes represent database tables and at least a portion of the links between nodes of the second set of nodes represent foreign key relationships;

receiving a first anchor point defining a correspondence between a first node in the first representation and a second node in the second representation;

receiving input identifying a source node in the first representation to be mapped to the second representation;

calculating a source distance between the source node and the first node of the first anchor point in the first representation, wherein calculating the source distance comprises identifying a fewest number of links that connect the source node and the first node of the first anchor point;

calculating one or more option distances between the second node of the first anchor point in the second representation and one or more other nodes in the second representation, wherein calculating a given option distance comprises identifying a fewest number of links that connect a given node in the second representation and the second node of the first anchor point;

calculating one or more penalty scores for option distances of the one or more option distances based on the one or more option distances and the source distance, wherein calculating a given penalty score comprises subtracting the source distance from an option distance of the one or more option distances;

ranking the one or more other nodes in the second representation based on their respective penalty scores;

selecting a mapping node from the one or more other nodes in the second representation based at least in part on their respective penalty scores, wherein the mapping node corresponds to the source node;

storing a new anchor point identifying a correspondence between the source node of the first representation and the mapping node of the second representation and transforming the second representation to align with the first representation by adding one or more links between nodes in the second representation such that the second node of the first anchor point has the same distance to the mapping node of the second representation as the first node of the first anchor point in the first representation and the source node of the first representation.

9. The one or more tangible computer-readable storage media of claim 8, the operations further comprising:

receiving a second anchor point defining a correspondence between a third node in the first representation and a fourth node in the second representation;

calculating a second source distance between the source node and the third node of the second anchor point in the first representation, wherein calculating the second source distance comprises identifying the fewest number of links that connect the source node and the third node of the second anchor point;

calculating one or more second option distances between the fourth node of the second anchor point in the second representation and the one or more other nodes in the second representation wherein calculating a given second option distance comprises identifying the fewest number of links that connect a given second node in the second representation and the fourth node of the second anchor point;

calculating one or more second penalty scores for second option distances of the one or more second option distances based on the respective second option distances and the second source distance, wherein calculating a given second penalty score of the one or more second penalty scores comprises subtracting the second source distance from a second option distance of the one or more second option distances; and aggregating the one or more penalty scores and the one or more second penalty scores for the for nodes of the one or more other nodes in the second representation, wherein the aggregating comprises averaging a given penalty score and a corresponding second penalty score for a given node of the one or more other nodes in the second representation.

10. The one or more tangible computer-readable storage media of claim 8, wherein selecting the mapping node comprises analyzing the ranked one or more other nodes in the second representation and their respective penalty scores by a machine-learning algorithm which returns the mapping node.

11. The one or more tangible computer-readable storage media of claim 8, wherein selecting the mapping node comprises providing the ranked one or more other nodes in the second representation and their respective penalty scores to a user and receiving a selection of the mapping node from the user.

12. The one or more tangible computer-readable storage media of claim 8, wherein the mapping node comprises a selection of two or more nodes from the ranked one or more other nodes in the second representation.

13. The one or more tangible computer-readable storage media of claim 8, the operations further comprising:

accessing a source database corresponding to the first representation;

extracting data from a first table in the source database corresponding to the source node in the first representation;

accessing a second database corresponding to the second representation;

storing the extracted data in a second table in the second database corresponding to the mapping node based on the stored new anchor point.

14. The one or more tangible computer-readable storage media of claim 8, the operations further comprising:

generating a database view based on a first database corresponding to the first representation and a second database corresponding to the second representation, wherein data in the database view is deduplicated based on the correspondence between the source node and the mapping node identified in the new anchor point.

15. A computing system comprising:

one or more memories;

one or more processing units coupled to the one or more memories; and one or more computer-readable storage media storing instructions that, when executed, cause the computing system to perform operations comprising:

receiving a first graph providing a first representation representing a first data model, wherein the first representation comprises a first set of nodes and links between nodes of the first set of nodes, wherein at least a portion of the nodes of the first set of nodes represent database tables and at least a portion of the links between nodes of the first set of nodes represent foreign key relationships;

receiving a second graph providing a second representation representing a second data model, wherein the second representation comprises a second set of nodes and links between nodes of the second set of nodes, wherein at least a portion of the nodes of the second set of nodes represent database tables and at least a portion of the links between nodes of the second set of nodes represent foreign key relationships;

receiving a first anchor point defining a correspondence between a first node in the first graph and a second node in the second graph;

receiving input identifying a source node in the first graph to be mapped to the second graph;

calculating a source distance between the source node and the first node of the first anchor point in the first graph, wherein calculating the source distance comprises identifying a fewest number of links that connect the source node and the first node of the first anchor point;

calculating one or more option distances between the second node of the first anchor point in the second graph and one or more other nodes in the second graph, wherein calculating a given option distance comprises identifying a fewest number of links that connect a given node in the second representation and the second node of the first anchor point;

calculating one or more penalty scores for the one or more option distances based on the one or more option distances and the source distance, wherein calculating a given penalty score comprises subtracting the source distance from an option distance of the one or more option distances;

ranking the one or more other nodes in the second graph based on their respective penalty scores;

providing the ranked one or more other nodes and their respective penalty scores;

receiving a selection of a mapping node from the ranked one or more other nodes in the second graph, wherein the mapping node corresponds to the source node;

storing a correspondence between the source node of the first graph and the mapping node of the second graph; and transforming the second graph to align with the first graph by adding one or more links between nodes in the second graph such that the second node of the first anchor point has the same distance to the mapping node of the second graph as the first node of the first anchor point in the first graph and the source node of the first graph.

16. The computing system of claim 15, the operations further comprising:

receiving a second anchor point defining a correspondence between a third node in the first graph and a fourth node in the second graph;

calculating a second source distance between the source node and the third node of the second anchor point in the first graph, wherein calculating the second source distance comprises identifying the fewest number of links that connect the source node and the third node of the second anchor point;

calculating one or more second option distances between the fourth node of the second anchor point in the second graph and the one or more other nodes in the second graph wherein calculating a given second option distance comprises identifying the fewest number of links that connect a given second node in the second graph and the fourth node of the second anchor point;

calculating one or more second penalty scores for second option distances of the one or more second option distances based on the one or more second option distances and the second source distance, wherein calculating a given second penalty score of the one or more second penalty scores comprises subtracting the second source distance from second option distance of the one or more second option distances; and aggregating the one or more penalty scores and the one or more second penalty scores for nodes of the one or more other nodes in the second graph, wherein the aggregating comprises averaging a given penalty score and a corresponding second penalty score for a given node of the one or more other nodes in the second representation.

17. The computing system of claim 15, wherein the ranked one or more other nodes in the second representation and their respective penalty scores are provided to a machine-learning algorithm trained to select the mapping node from a structurally analyzed set of nodes and rankings.

18. The computing system of claim 15, wherein the mapping node comprises a selection of two or more nodes from the ranked one or more other nodes in the second representation.

19. The computing system of claim 15, wherein selecting the mapping node comprises providing the ranked one or more other nodes in the second representation and their respective penalty scores to a user and receiving a selection of the mapping node from the user.

20. The computing system of claim 15, wherein selecting the mapping node comprises analyzing the ranked one or more other nodes in the second representation and their respective penalty scores by a machine-learning algorithm which returns the mapping node.

* * * * *